US011010712B2

(12) United States Patent
Milum

(10) Patent No.: US 11,010,712 B2
(45) Date of Patent: May 18, 2021

(54) SYSTEM AND METHOD FOR FRACTIONAL RFID INVENTORY TRACKING AND MANAGEMENT

(71) Applicant: Craig E. Milum, Phoenix, AZ (US)

(72) Inventor: Craig E. Milum, Phoenix, AZ (US)

( * ) Notice: Subject to any disclaimer, the term of this patent is extended or adjusted under 35 U.S.C. 154(b) by 0 days.

(21) Appl. No.: 16/103,919

(22) Filed: Aug. 14, 2018

(65) Prior Publication Data
US 2020/0057979 A1 Feb. 20, 2020

Related U.S. Application Data

(63) Continuation-in-part of application No. 14/715,926, filed on May 19, 2015, now abandoned.

(51) Int. Cl.
| | |
|---|---|
| *G06Q 10/08* | (2012.01) |
| *G06Q 20/20* | (2012.01) |
| *G06Q 30/02* | (2012.01) |
| *G06K 19/07* | (2006.01) |
| *G06K 7/10* | (2006.01) |

(52) U.S. Cl.
CPC ....... *G06Q 10/087* (2013.01); *G06K 7/10366* (2013.01); *G06K 19/0723* (2013.01)

(58) Field of Classification Search
CPC ............ G06Q 10/087; G06K 7/10366; G06K 19/0723
See application file for complete search history.

(56) References Cited

U.S. PATENT DOCUMENTS

| | | | |
|---|---|---|---|
| 7,920,063 | B2 | 4/2011 | Ulrich |
| 9,123,016 | B2 | 9/2015 | Jones |
| 10,095,996 | B2 * | 10/2018 | Belstner ............. G06K 19/0723 |
| 2005/0035849 | A1 * | 2/2005 | Yizhack ............... G06K 7/0008 340/5.92 |
| 2006/0237532 | A1 | 10/2006 | Scott-Leikach et al. |
| 2007/0150383 | A1 | 6/2007 | Shakes et al. |
| 2007/0285242 | A1 | 12/2007 | Highman |
| 2008/0061125 | A1 | 1/2008 | Langlois et al. |
| 2009/0048704 | A1 | 2/2009 | Redford |
| 2009/0160622 | A1 | 6/2009 | Bautchot et al. |
| 2009/0230020 | A1 * | 9/2009 | Clayman .......... G06K 19/07327 206/719 |
| 2012/0019399 | A1 | 1/2012 | Vargo et al. |

(Continued)

*Primary Examiner* — Talia F Crawley
(74) *Attorney, Agent, or Firm* — Wright Law Group, PLLC; Mark F. Wright

(57) ABSTRACT

A low cost, highly reliable system and method for tracking re-usable textile inventory movement is disclosed. The system is adapted for use within a commercial linen processing facility and its customers' facilities suitable for linen or apparel service providers where the linen processing facility company owns, maintains, and leases the inventory used by its customers. The system and method are also suitable for customers who own their own linens and apparel and outsource the laundering. The system employs radio frequency identification (RFID) tags inserted permanently into a pre-determined fraction (e.g., some number less than 100%) of the textile products. In conjunction with scanning equipment and computer software, the system can provide information on inventory movement, use, abuse, durability, and loss. In order to determine the optimal target fraction for each inventory item a number of variables are considered.

10 Claims, 12 Drawing Sheets

(56) References Cited

U.S. PATENT DOCUMENTS

| | | | |
|---|---|---|---|
| 2014/0279294 A1 | 9/2014 | Field-Darragh et al. | |
| 2015/0012396 A1* | 1/2015 | Puerini | G06K 9/00771 |
| | | | 705/28 |
| 2016/0132821 A1* | 5/2016 | Glasgow | G06Q 10/087 |
| | | | 705/28 |
| 2016/0342936 A1* | 11/2016 | Milum | G06Q 10/087 |
| 2017/0053514 A1* | 2/2017 | Glasgow | G06K 7/10366 |
| 2017/0140330 A1* | 5/2017 | Rinzler | H02J 7/0042 |
| 2017/0162027 A1* | 6/2017 | Glasgow | D06F 93/00 |
| 2018/0142394 A1* | 5/2018 | DeBates | D06F 33/30 |
| 2018/0144232 A1* | 5/2018 | DeBates | G06K 7/10366 |
| 2018/0211208 A1* | 7/2018 | Winkle | H04L 67/12 |
| 2018/0374069 A1* | 12/2018 | Frankel | H04L 43/067 |
| 2020/0013096 A1* | 1/2020 | Park | G06K 7/10366 |

\* cited by examiner

| Mop Towel | | |
|---|---|---|
| FACTOR | RANGE | SCORE |
| 1 | >100 | 1 |
| 2 | 1.3 - 2.9 | 4 |
| 3 | .85 -.99 | 6 |
| 4 | 2.1% - 5.0% | 10 |
| 5 | <$1.00 | 1 |
| 6 | 0 | 0 |
| 7 | >500 | 5 |
| 8 | Somewhat Likely | 5 |
| 9 | Not So Important | 0 |
| 10 | >10% | 5 |
| TOTAL SCORE | | 37 |
| % TO BE TAGGED | | 3% |

| Black Napkin | | |
|---|---|---|
| FACTOR | RANGE | SCORE |
| 1 | >100 | 1 |
| 2 | 1.3 - 2.9 | 4 |
| 3 | .85 -.99 | 6 |
| 4 | 0.0% - 1.0% | 1 |
| 5 | $1.01 -$3.00 | 3 |
| 6 | >100 | 10 |
| 7 | >500 | 5 |
| 8 | Somewhat Likely | 5 |
| 9 | Somewhat Important | 5 |
| 10 | >10% | 5 |
| TOTAL SCORE | | 45 |
| % TO BE TAGGED | | 3% |

| 66" x 120" Tablecloth | | |
|---|---|---|
| FACTOR | RANGE | SCORE |
| 1 | >100 | 20 |
| 2 | 1.3-2.9 | 4 |
| 3 | .85-.99 | 6 |
| 4 | 0.0% - 1.0% | 2 |
| 5 | <$1.00 | 5 |
| 6 | 51 - 100 | 4 |
| 7 | >500 | 5 |
| 8 | Somewhat Likely | 5 |
| 9 | Very Important | 15 |
| 10 | <10% | 0 |
| TOTAL SCORE | | 66 |
| % TO BE TAGGED | | 7% |

| 120" Round Tablecloth | | |
|---|---|---|
| FACTOR | RANGE | SCORE |
| 1 | 26 - 100 | 10 |
| 2 | 1.3-2.9 | 4 |
| 3 | .85-.99 | 6 |
| 4 | 2.1% - 5.0% | 10 |
| 5 | >$25.00 | 40 |
| 6 | 36 - 50 | 6 |
| 7 | >500 | 5 |
| 8 | Very Likely | 10 |
| 9 | Very Important | 15 |
| 10 | >10% | 10 |
| TOTAL SCORE | | 116 |
| % TO BE TAGGED | | 20% |

SYSTEM AND METHOD FOR FRACTIONAL RFID INVENTORY TRACKING AND MANAGEMENT

BACKGROUND OF THE INVENTION

1. Technical Field

The present invention relates generally to inventory tracking systems and more specifically relates to tracking generic and/or special reusable textile items in a semi-closed loop system.

2. Background Art

For most commercial facilities where textile products are used in significant quantities, large industrial laundries have substantially replaced small scale laundering sited at the facility. Large scale, offsite laundering has the inherent benefit of reduced processing costs by affording more automation and bulk buying of chemicals and textiles versus on site laundering. However, offsite laundering of multiple customers' same or similar style of soiled linens and uniforms often exacerbates inventory control and linen inventory management issues.

Though users with a high volume of laundry service needs will sometimes own their own linens and outsource the laundering function, the most typical scenarios includes a linen service provider that owns the textile products and leases the linens to the customer (e.g., restaurant, hospital, etc.), picks up soiled linens, launders, replaces textiles as needed, and delivers back a similar or same quantity of clean linens as a complete end-to-end service. As might be expected, the company that owns the textiles is directly concerned with either the return of inventory by the textile user or the processing and return of inventory by the linen processing facility.

There are a number of issues that should be addressed in the outsourced linen service processing application. For example, how much inventory has each customer lost, abused, or stored without using for unreasonable periods of time? How does one manufacturer's textile products compare with others for durability, ease of soil, and stain removal? How much inventory does the linen processing facility have on its premises in process or storage at anyone moment? How much does the linen user have in their custody between clean delivery and soiled linen pick up?

Linen replacement is a major part of textile services costs, representing typically 10% to 20% of the total costs of the textile usage. Waste in textile loss, abuse, and poor utilization of inventory typically account for approximately 6%-10% of the total textile usage costs and typically can be understood, controlled, and managed productively through effective inventory tracking.

The current standard operating inventory tracking procedures for most linen service organizations are not effectively tracking linen inventory despite the large cost of waste. The reason is because the return on investment needed to implement an effective inventory tracking system is too small for the probable benefit gained. The major concern is that reduced linen inventory replacement costs that result from effective inventory tracking will be negated by the added complexity and costs of accurately monitoring a very large volume of low value individual soiled and clean linen transactions.

Some of the consequences of limited inventory monitoring are excessive pilferage, accidental or inappropriate intentional discard of soiled linens, needless stockpiling of textiles, abusive usage, and hoarding practices. These outcomes continue indefinitely or until a responsible person within the linen service customer's organization becomes aware of the problem and takes corrective action. Additionally, there are numerous causes of waste and each cause requires one or more corrective or new processes to be implemented. These corrective actions may include in whole or part: (1) staff re-training; (2) termination of employees for cause (e.g., theft or gross negligence); (3) improving physical safeguards and procedures; (4) changing textile specifications; (5) etc.

Soiled linen counting employs visual processes and human or photo eye counting is labor intensive even in a linen processing facility with substantial investment in automated counting equipment such as bar code scanning. Most automated soiled linen counting systems tend to undercount the actual amount of linen being processed. One reason for this is that it is common for soiled linens tend to cling together during soiled linen sorting and counting, causing fewer items to be counted than actually processed. Additionally, customer soiled linen bags may lose the identifying tags during handling and transit, thereby preventing a full and accurate count of returned linens. Conversely, other items are unlikely to be counted twice while items not presented or presented clinging or attached to other soiled linens are rarely counted. The effect of these counting errors is likely to be significant over time.

For example, if the tendency to undercount is 0.5%, and the average inventory of a customer's textiles are equal to one week's usage, the soiled linen counts within 52 weeks are likely to result in the inventory being reduced by 26% due to systemic inventory under counting errors that will result in a 0.5% less on the average delivered back clean each delivery than the soiled linens picked up. In this example, the customer starts the year with an inventory of 100 towels but, by the end of the year, there may be only 74 towels counted in the inventory due not to actual loss but due to the 0.5% under counting tendency.

Less accurate counting may result in even more drastic customer "losses" being calculated erroneously. In many cases, customers do not believe the accuracy of the linen counts provided by their linen service provider as they have seen obvious errors such as zero of certain items returned that are always used in large quantities as a necessary part of the customer's operations. The counting errors may be so numerous and so difficult to avoid that many linen service operations have given up counting and simply determined to bill all customers an average surcharge for linen replacement. In these systems, each customer pays a fixed amount or fixed percentage of usage, regardless of how many linen pieces are actually lost or abused, so there is no or little incentive for the customer to reduce loss and abuse.

In order to address these various problems, a few linen service companies have attempted to provide for more reliable and accurate tracking and reporting of the linen inventory by embedding Radio Frequency Identification ("RFID") tags into all of the linen inventory or all of certain more expensive items within the inventory. For most general linen service companies, this level of tagging usually is prohibitively expensive, difficult to implement, and may not always provide the anticipated results. This is most often the case because of the typically large accumulated initial and ongoing cost of purchasing the tags and inserting into the textile inventory either during the manufacturing process or at the linen processing facility. The cost of maintaining the RFID tags in all textiles or all of certain types of textiles is usually even higher than the potential savings gained with the tagging of the inventory.

Textile products other than apparel provided by linen service laundries are rarely assigned to individual persons or even specific linen users as there is typically little or no benefit gained and the cost of this customer specific processing is usually cost prohibitive. Therefore, linens are typically treated as "pooled inventory" items while garments such as uniforms are more commonly wearer specific and assigned to a specific wearer within the customer's organization. In the case of uniforms assigned to specific persons within a customer, RFID tagging of inventory is becoming increasingly common.

Currently, RFID tagging of textile services inventories has been primarily practiced on uniforms, in part because uniform service inventory items are more expensive per unit than linen service items such as flat linens (e.g., towels, bed linens, table linens, kitchen linens, etc.). Also, uniforms are usually identified with or assigned to a specific individual to whom the uniforms are dedicated on an exclusive basis, making it reasonable to place RFID tags in each uniform inventory item to identify a specific individual. An advantage of RFID tags on personalized uniforms is that RFID tagged personalized uniforms can be automatically identified and sorted by customer and employee so that they are economically and reliably delivered back to the correct wearer of the uniforms. Linen service companies rarely attempt to assign certain like flat linen items to a single specific customer location. Consequently, there is no significant benefit to automated identification and sorting of like appearing flat linen items. Like linen service items are normally pooled regardless of where they came from and then processed and mixed together in a batch process. Following assembling linen service items into bundles ready for sending to the end user customer, the linen bundles are then distributed to specific customers for delivery commensurate to the customers' needs and past usage.

RFID tagging of textiles in a linen service business has been relatively uncommon within mainstream linen service providers due to the associated costs of tagging all the linens and the relatively low propensity of linens to be lost. Typical of specialized linen service operations that employ RFID tagging to track inventory are one-time rental use companies specializing in providing linens for off-site parties and special events. Such services generally utilize substantially more expensive textile items than typical linen services and the frequency of loss is higher than traditional linen service to regular, constant linen using restaurants, lodging properties, and health care facilities. Use of RFID tagging in the mainstream linen service industry has been practiced only in a small number of linen processing facilities and generally for a small number of customers using expensive, high loss items.

Further, due to the large number of like items pooled and served to a number of customers, as the ratio of pooled, tagged inventory is increased, it becomes progressively more time intensive per untagged linen item found to identify the remaining items not yet tagged. Equipment for automatically identifying and sorting tagged inventory pieces from non-tagged inventory pieces can be extremely expensive with costs exceeding $1,000,000 per location to set up. Accordingly, unless further improvements are made in the inventory tracking and reporting system, particularly for low cost, high turnover linens that comprise over 90% of the overall linen service inventory, the operational aspects of various RFID inventory tracking systems will continue to be sub-optimal.

BRIEF SUMMARY OF THE INVENTION

A low cost, highly reliable system and method for tracking inventory movement is disclosed. At least one preferred embodiment of the system and method is adapted for use within a commercial linen processing facility and its customers' facilities suitable for linen or apparel service providers where the linen processing facility owns, maintains, and leases the inventory used by its customers. The system and method are also suitable for customers who own their own linens and apparel and outsource the laundering. The system and method are also useful for inventory tracking in industries other than linen and laundry processing. The system and method employ radio frequency identification (RFID) tags inserted into or attached to a pre-determined fraction (e.g., some number less than 100%) of the inventory. In conjunction with scanning equipment and computer software, the system can provide information on inventory movement, use, abuse, durability, and loss for all inventory of any item for which the total inventory is only fractionally tagged. In order to determine the optimal target fraction for each inventory item a number of variables are considered.

The target optimal fraction for each inventory will generally depend upon such variables as: 1) the approximate number of the items served on the average per week to each customer that uses the item; 2) frequency of delivery; 3) the cost of tag installation; 4) the likelihood of the items becoming lost, abused, delayed in being used, and returned for repair or replacement; 5) the cost of adding a new item to the inventory; 6) the anticipated number of uses over item life time before retirement due to normal wear and tear; 7) the anticipated number of tag cycles before failure of the tag itself due to normal wear and tear; 8) the likelihood that loss and abuse will be stopped if the customer/linen user organization is aware of the extent of the loss and abuse; 9) the number and importance of opportunities in laundry production to track production processing of items by operator for tagged items to facilitate determining quality of workmanship by operator and quantity of output by production operator; and 10) the variance of the number of servings achievable before retirement by various textile manufacturers of each item.

BRIEF DESCRIPTION OF THE DRAWINGS

The various embodiments of the present invention will hereinafter be described in conjunction with the appended drawings, wherein like designations denote like elements, and:

FIG. 5 is a table representing the scoring process for inventory items in accordance with a preferred exemplary embodiment of the present invention;

DETAILED DESCRIPTION OF INVENTION

Figure 1:
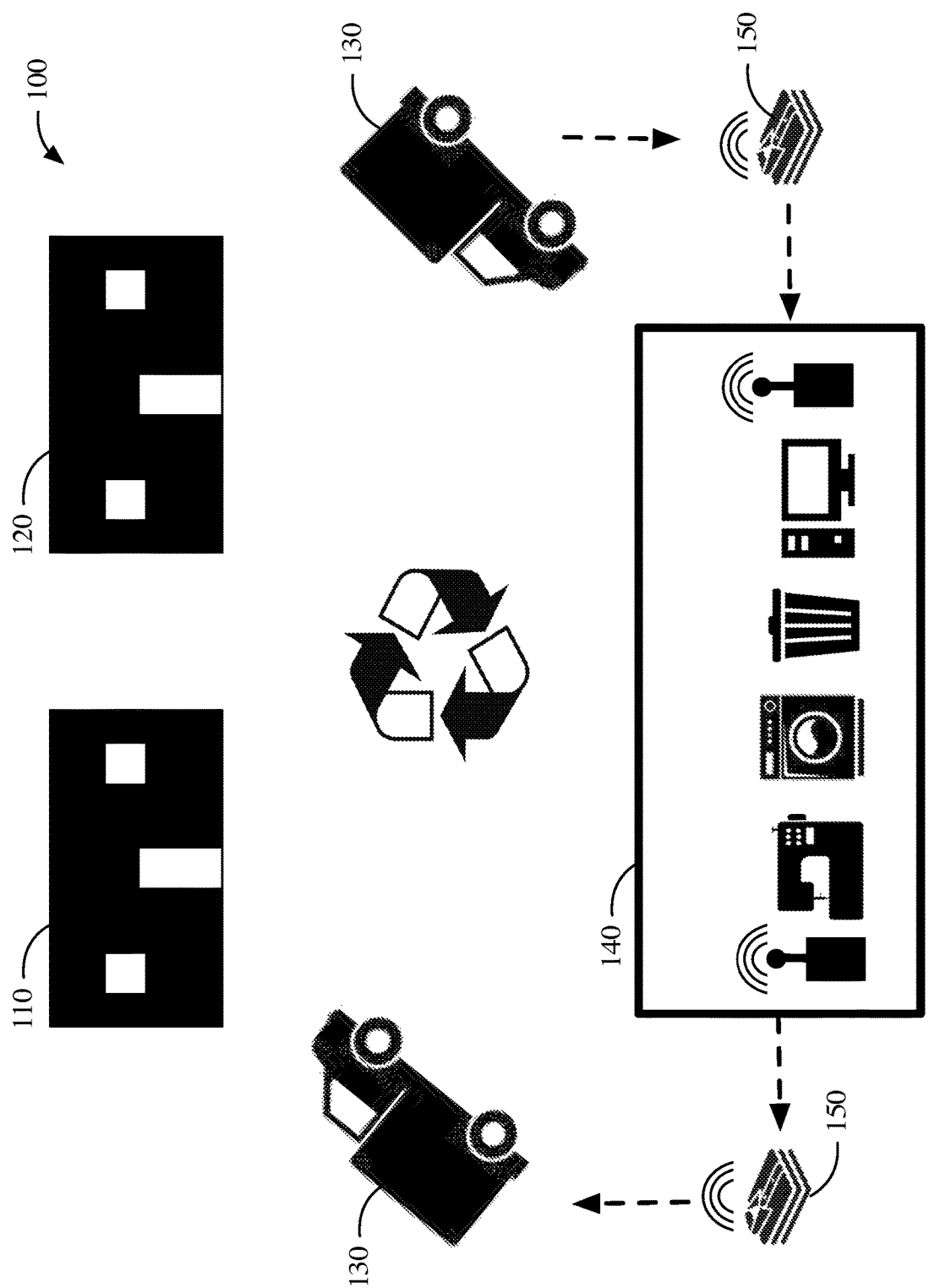
FIG. 1 is a block diagram of a system for fractional inventory tracking and management in accordance with a preferred exemplary embodiment of the present invention.

The most preferred embodiments of the present invention, when adapted for use in a linen service application, comprises: 1) an RFID scanning station at the linen processing facility used for: scanning clean linens prior to delivery to a customer; scanning clean linens still stained after regular washing; special washing for items already washed over in a generic stain treatment wash; and scanning to aid a linen service worker in identifying items in a customer order that are incongruent with the expected outcome (e.g., an item in the delivery container that is not in the customer's requested order). This station is most commonly used for scanning clean linens prior to delivery and can be adapted through the use of software and physical settings to assist the linen service in locating any textile items of the wrong type mistakenly packaged for delivery to a customer; 2) an RFID scanning station for scanning soiled linens returned to the linen processing facility for processing; 3) at least one RFID scanning station for assigning and de-assigning RFID tagged items; and 4) at least one handheld RFID scanning device for mobile scanning at the linen processing facility or customer facility.

In the most preferred embodiments of the present invention, textiles are generally tagged in fractional proportions, logically based on the pertinent characteristics of the items and their anticipated usage. The amount of this fraction will most likely vary for each different item in the total inventory but will generally be a pre-determined number or percentage that is calculated using specific variables or parameters. In most cases, the optimal target fraction for each item in the inventory depends upon such variables as: 1) the approximate number of the items served on the average per week to each customer that uses the item; 2) frequency of delivery; 3) the cost of tag installation; 4) the likelihood of the items becoming lost, abused, delayed in being used and returned for launderings; 5) the cost of adding a new item to the inventory; 6) the anticipated number of life time uses before retirement due to normal wear and tear; 7) the anticipated number of tag cycles before retirement due to normal wear and tear; 8) the likelihood that loss and abuse will be stopped if the customer organization is aware of the extent of the loss and abuse; 9) the number and importance of opportunities in laundry production to track production processing of items by operator for tagged items to facilitate determining quality of workmanship by operator and quantity of output by production operator; and 10) the variance of the number of servings achievable before retirement by various manufacturers of each item. The table below can be completed to assign a certain number of "points" based upon the specific characteristics of each inventory item type. The number of points can be used to determine the optimal fraction of inventory tagging for that specific inventory item.

TABLE 1

| Element, Characteristics of a Specific Inventory Item | Possible Range | Assigned Points |
| --- | --- | --- |
| 1. Average number of inventory items provided on each delivery to each customer that uses the inventory item. | 1-10 | 35 |
| | 11-25 | 20 |
| | 26-100 | 10 |
| | >100 | 1 |
| 2. Average frequency of delivery per week for all customers. | <1.2 | 6 |
| | 1.3-2.9 | 4 |
| | >3 | 2 |
| 3. Cost of tag installation per unit, including tag and labor ($). | 0.01-0.99 | 6 |
| | 1.00-1.50 | 4 |
| | >1.50 | 1 |
| 4. Likelihood of items becoming lost, abused, delayed in being used and returned for repair/replacement. | 0-1.0% | 1 |
| | 1.1-2.0% | 2 |
| | 2.1-5.0% | 10 |
| | >5% | 15 |
| 5. Cost of adding a new item to inventory ($). | <1.00 | 1 |
| | 1.01-3.00 | 5 |
| | 3.01-5.00 | 10 |
| | 5.01-10.00 | 20 |
| | 10.01-25.00 | 30 |
| | >25.00 | 40 |
| 6. The anticipated number of life time uses for an item in the inventory before retirement due to normal wear and tear | >10 | 0 |
| | 10-20 | 2 |
| | 21-35 | 4 |
| | 36-50 | 6 |
| | 51-100 | 8 |
| | >100 | 10 |
| 7. Anticipated number of tag cycles before failure due to normal wear and tear. | <250 | 0 |
| | 250-500 | 3 |
| | >500 | 5 |
| 8. Likelihood that loss and abuse will be substantially reduced if the linen customer is aware of the extent of loss and use. | Unlikely | 0 |
| | Somewhat likely | 5 |
| | Very likely | 10 |
| 9. Importance of opportunities in production to track production processing of items by operator for tagged items to facilitate determining quality of workmanship by operator and quantity of output by | Not important | 0 |
| | Somewhat important | 8 |
| | Very important | 15 |
| 10. Variance of the number of servings achievable before retirement by various manufacturers of each item. | <10% | 0 |
| | 10%≥ | 10 |

For the first three variables listed in Table 1, a higher number generally tends to decrease the optimal ratio of tagged inventory to untagged inventory. For the remaining variables listed in Table 1, the higher number tends to generally increase the optimal ratio of tagged inventory to untagged inventory. With a fractional inventory tagging system, if these variables remain relatively stable, then the optimal fractional ratio target will be similarly stable, but, as the variables change, the optimal fractional target ratio is likely to change for each item, based on the relative weight that each variable has in the overall determination process for the optimal target ratio determination.

Using Table 1, it is possible to calculate a score for each inventory item and then using Table 2 determine the appropriate number of items (%) to be tagged with an RFID tag in order to monitor the inventory. The minimum number of points possible for any inventory item is 6 and the maximum number of points for any inventory item is 139. As shown in Table 2, for the most preferred embodiments of the present invention, the percentage of inventory items with RFID tags will typically vary from 3%-20%, depending on the specific combination of points awarded. Given that some of the variables are evaluated on a more subjective scale, it is anticipated that the actual scores and percentage of inventory tagged will vary from application to application as each linen processing operation determines the best parameters for their specific inventory items and customer base. Additionally, each linen processing facility may adjust the numbers based on their specific use patterns for their specific inventory. However, Table 1 and Table 2 provide guidance for implementing various preferred embodiments of the present invention. Further, those skilled in the art will recognize that Table 1 and Table 2 may be values stored in a computer memory and the calculation of scores and percentages may be determined programmatically by inventory mechanism 264 and computer 250.

TABLE 2

| Total Number of Points | % of Inventory to be Tagged |
| --- | --- |
| 111-139 | 20% |
| 65-110 | 10% |
| 58-64 | 7% |
| 51-57 | 5% |
| 6-50 | 3% |

Further, the most preferred embodiments of the present invention comprise a combination hardware/software system specifically developed for RFID tag inventory tracking that is integrated with the linen service's customer invoicing system, thereby enabling the inventory tracking system to catch errors such as incorrect items placed in the customers' delivery orders. The software system tracks each inventory delivery, the total number of each type of inventory item delivered, and the ratio of each RFID tagged item to non-tagged items within the specific order for the inventory being delivered.

By implementing one or more preferred embodiments of the present invention, various business operations, including the linen service industry, can more economically and profitably utilize fractional RFID tag tagging to track all inventory items, even those items with low costs and low probability of loss so as to enjoy the similar information benefits and cost reductions typically provided by 100% item tagging, and sometimes with even greater benefits than with 100% inventory tagging, all at a much lower costs than associated with 100% tagging solutions and systems. The introduction of fractional tagging allows a company to gain practically all of the benefits of 100% RFID tagging capabilities for about 5% of the cost. With fractional RFID tagging as taught herein, the amount of the inventory for each item served to a linen service customer is known; the total clean inventory sent to the customer, tagged and not tagged, less inventory returned by a customer, estimating the total returned inventory by assuming that each returned tagged item represents the inverse of the fraction applicable to the clean delivery of each individual previously delivered tagged item.

The linen service industry provides approximately 8 billion dollars of services annually in the United States. Approximately five hundred million textile items valued at an approximate replacement cost of one and a half billion dollars are presently in service to provide for customer textile needs. Approximately 1.2 billion dollars is spent in linen service inventory replacement annually to maintain inventory levels and of that 1.2 billion dollars, approximately 300 million dollars, is reasonably avoidable waste that, once identified, could be reduced or eliminated through customer management action using fractional, but, comprehensive RFID tagging throughout the private sector linen service inventory.

On top of the reduction in loss, the most preferred embodiments of the present invention enable identification of excessive inventory stockpiling by linen service customers, facilitating approximately 100 million dollars in annual savings nationally as the inventory levels are reduced to optimal or near optimal levels. An additional 50 million dollars in savings to the national economy is anticipated due to similarly identifying abused linens and their customer sources of abuse after washing when abuse can often first be identified since heavily soiled items are not necessarily abused and what looks too soiled to successfully wash and return to duty may be rendered stain free after a single standard wash.

It is anticipated the preferred embodiments of the fractional tagging system disclosed herein may, over time, yield more accurate inventory tracking than a 100% RFID tagging system. The fractional RFID tagging system as described herein may provide cost savings in the range of approximately 95% of a 100% RFID tagged system to initially set up and will typically cost about 95% less to operate than a 100% RFID tagged system. In the most preferred embodiments of the present invention, RFID tags can be read by "line of sight" antennae signal view. A textile item bearing an RFID tag that is positioned directly between an RFID tagging antennae and another textile item bearing an RFID tag that is positioned a further distance from the antennae may prevent the more distant RFID tag from being detected and read if the tag nearer the antennae obscures the antennae's "line of sight" view of the second tag from the antennae.

Multiple RFID tag scanning antennae located at diverse angles to the target RFID tags, coupled with low density of the fractional RFID tag concept, maximizes the likelihood of all tags being read versus a 100% inventory tagging system due to the line of sight sensing problems that increase with the greater tag density required in a 100% inventory tagging system. Additionally, a fractional RFID tagging solution in accordance with a preferred embodiment of the present invention will prospectively reduce operating expenses of a typical visual based soiled linen counting system by around 95% while yielding greater accuracy.

The most preferred embodiments of the present invention include an inventory tracking and reporting mechanism that tracks the fraction of tagged items to untagged inventory items on all customer deliveries. Each tagged inventory item in a delivery represents itself and a number of like, but untagged additional items. If a tagged inventory item is not returned, it is assumed that the unreturned, tagged inventory item represents itself and additional untagged inventory items calculated by dividing the number of tagged items in a specific customer order into the total number of clean items, tagged and untagged.

For example, if 1,000 napkins are delivered in a specific order and there were 40 RFID tagged napkins in that order, then 4% of the delivered items were tagged and each tagged napkin represents 25 napkins (e.g., the tagged napkin plus 24 untagged napkins). Tumbling and mixing the napkins in the washing/drying or conditioning process (e.g., partial drying to reduce moisture retained in the fabric following the washing and extraction processes and in advance of ironing/pressing) ensures a random mix of tagged versus non-tagged inventory throughout the processing batches and each customer's delivery batch.

If three of the 4% fractional inventory RFID tagged napkins from a delivery of 1,000 napkins cannot be accounted for within ninety days by subsequent soiled inventory and/or clean inventory scanning at the linen processing facility, nor hand scanning at the customer's location, then it would be logical to assume that approximately 75 napkins of the original 1,000 delivered have been lost, discarded, and/or temporarily misplaced away from the customer's areas being hand scanned to locate the "missing" napkins.

With most flat linens, the advantages of the preferred embodiments of the present invention strongly favor fractional tagging over 100% tagging. Implementation of fractional (i.e., partial, sample, or limited) inventory tagging for a linen service operation can likely be accomplished in approximately two to four months without the expenditure of substantially greater than normal inventory purchasing by the linen processing facility following these steps.

The total amount of any one item in circulating inventory, at the linen processing facility, on trucks, and at the customers locations at any one time maybe be estimated by summing the outstanding active tagged items (assigned tags with at least one clean scan and the number of untagged items each tagged item represents based upon its last delivery fraction believed to be in active duty.

The most preferred embodiments of the present invention similarly may calculate the average fraction of inventory tagged of the total of system's total like pieces, those tagged and those not tagged combined. Linen processing facility management can use this information to determine when and how much tagged inventory injections to add in order to achieve the target fraction of tagged inventory for each item.

To maintain the target fraction of tagged inventory versus total inventory for any one item, each injection of new inventory will typically include the targeted SKU fraction of tagged new inventory with untagged inventory into the circulating inventory per each wash batch until all new untagged and tagged items have been inserted into active inventory. For example, if 5% of the inventory is the target fraction for a certain item to be RFID, then for each hundred items put into service, five of the new inventory items should have RFID tags inserted and assigned as that item. The RFID tags are inserted into the inventory in a way that is normally undetectable except for RFID tag scanning and does not interfere with the regular use of the linen or apparel item. The goal is that linens with RFID tags and linens without RFID tags are treated by the customer and linen processing facility employees in an identical manner so that accurate information can be obtained on linen movement patterns and usage practices by tracking only the tagged items.

Referring now to FIG. 1, a block diagram of a system 100 for fractional inventory tracking and management in accordance with a preferred exemplary embodiment of the present invention is depicted. As shown in FIG. 1, a linen processing facility 140 provides regular linen service to customer location 110 and customer location 120. Vehicles 130 are used to transport inventory items 150 to and from customer location 110 and customer location 120 as well as other customer locations (not shown this FIG.). As used inventory items 150 are returned from customer location 110 and customer location 120, they are processed at linen processing facility 140 as needed. Once processed, inventory items 150 are then returned to customer location 110 and customer location 120 and/or other locations using the inventory items.

Although depicted in FIG. 1 as a stack of shirts, those skilled in the art will readily recognize that inventory items 150 may be any type of linens that are typically processed and used by a business. This includes, for example, uniforms, tablecloths, napkins, towels, etc. Additionally, for the most preferred embodiments of the present invention, inventory items 150 may actually be stored, bundled, and moved about in rolling laundry carts or bins.

Linen processing facility 140 receives used and soiled inventory items 150 from customer locations 110 and 120 and will use RFID scanners to identify and track inventory items 150 as they are processed at the linen processing facility 140. Processing at linen processing facility 140 includes washing, repairing, storing, and managing the overall volume of linens needed for customer location 110 and customer location 120. There will typically be multiple RFID readers at linen processing facility 140 including hand held readers, fixed position readers, mobile readers, etc. These RFID readers will be used to track linens 150 from the time they are received at linen processing facility 140, as they are processed at linen processing facility 140, and until they exit linen processing facility 140.

Figure 2:
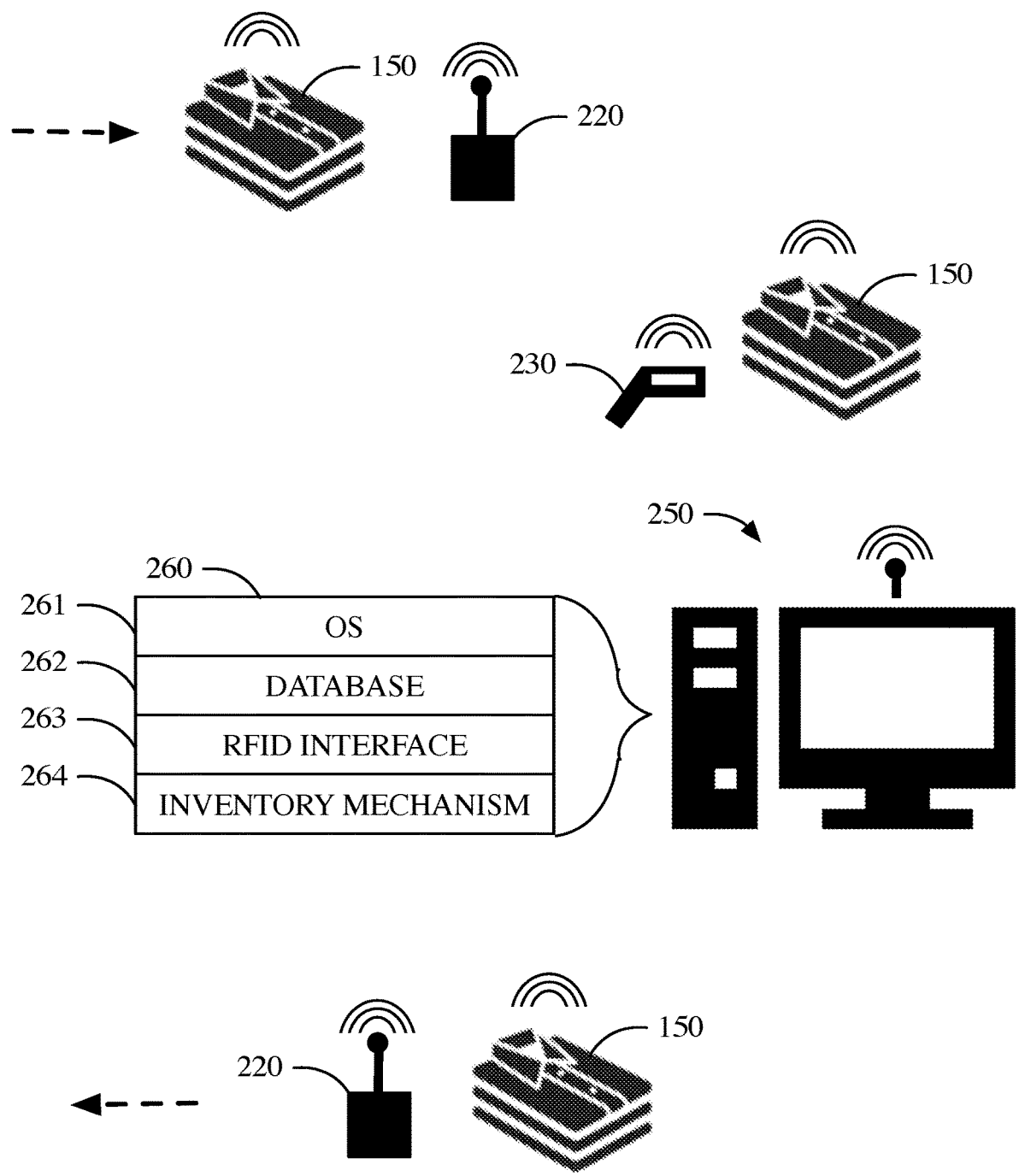
FIG. 2 is a block diagram of a system for fractional inventory tracking and management in accordance with a preferred exemplary embodiment of the present invention.

Referring now to FIG. 2, a block diagram of a portion of a system 200 for fractional inventory tracking and management in accordance with a preferred exemplary embodiment of the present invention is depicted. As shown in FIG. 2, RFID tagged inventory items 150 are tracked and managed by the use of RFID tags placed in inventory items 150. The RFID tags placed in inventory items 150 are read/scanned by RFID readers/scanners 220 and 230.

In the most preferred embodiments of the present invention, RFID tags will be placed into or affixed to a specified number of inventory items 150. Inventory items 150 may be purchased from the manufacturer with RFID tags in place or the RFID tags may be placed into or affixed to inventory items 150 after the manufacturing process has been completed. For example, inventory items 150 not RFID tagged during manufacture can be retrofitted with new or recycled RFID tags at the linen processing facility.

Basic sewing equipment and thread used by operators with basic sewing skills are all that are required to place RFID tags discreetly into most items. In the most preferred embodiments of the present invention, the RFID tagged items within the fractional RFID tagged inventory should be relatively difficult to detect by any means other than RFID scanning. Sometimes manufacturers' tags commonly found in textile products are designed and constructed to secure and hide the RFID tags from visual detection. Linens with hems of a half-inch or more can generally accept RFID textile tags. Linens with smaller hems have a reduced choice for inserting launderable RFID tags. Certain tags are designed so that they can be folded to reduce the footprint of the tag and facilitate fitting into smaller than half-inch hems. Folding the tags can reduce useful life of the RFID tag, though, not necessarily. Folded tags may also generate weaker UHF radio signals and therefore be harder to detect, but, not necessarily to such an extent as to be impracticable to use.

For items such as typical microfiber overlock stitched edge "terry" towels and wash cloths with overlock stitched edges rather than hemmed edges, the tag may be "hidden" or camouflaged by a swatch of self-fabric stitched over the RFID tag with the tag near the edge of an item and its self-cloth cover positioned under the manufacturer's cloth label if present. For by far the majority of textile items, a little creative thinking can generate a means of hiding the RFID tag from detection from all, but, purposeful item by item inspections where the person doing the inspection knows what to look for. Preventing easy detection of RFID tagged items is important as the accuracy of drawing conclusions accurate to all tagged inventory based upon only fractional tagging is dependent upon the users not distinguishing between tagged items and non-tagged items.

RFID readers/scanners 220 and 230 are representative of various types of RFID readers/scanners that may be used in the various preferred embodiments of the present invention. This would include fixed position RFID readers/scanners, mobile RFID readers/scanners, hand held RFID readers/scanners, etc. The "passive" RFID tags placed in linen service inventory items 150 emit a signal only when in the presence of a certain frequency range of radio wave. The signal from each tag is unique and associated with a unique serial number, typically an alphanumeric character string of 24 characters in length that is detected, scanned, or "read" by one or more RFID readers/scanners 220 and 230 during the various processes used at linen processing facility 140 as part of the linen processing cycle. By evaluating the actual percentage of a group of inventory items returned to the linen service that are actually tagged with an RFID tag in the group of inventory items as compared to an expected or desired value and evaluating the interval between clean linen delivery and soiled linen return for RFID tagged inventory or finding no return after an unreasonably lengthy interval for RFID tagged inventory, undesirable conditions such as excessive inventory turn around time at customer, excessive processing times at linen service plant, inventory "shrinkage" or loss, etc. can be determined.

This unique 24 character serial number has been assigned as a specific item in the record describing the inventory item in database 262 at the linen processing facility so that, for example, the item serial numbered 00007DC30212270E13F1314A is associated to a linen service textile item such as a 21"×21" cut size, spun polyester, ¼" hemmed red napkin during the useful life time of the napkin. When that specific red napkin is retired from service due to falling below the minimum quality standard, the RFID tag's serial number is de-assigned in the computer records and the item's RFID tag is removed. If this RFID tag is judged to have a sufficient number of additional servings left before the tag is expected to fail, the tag may be inserted into another new textile item being prepared for active inventory injection.

In the most preferred embodiments of the present invention, a computer 250, loaded with appropriate special purpose software, will be used to track the movement of the linen inventory throughout the linen processing cycle at the linen processing facility. Computer 250 may be any type of computer known to those skilled in the art that is capable of being configured for use with the preferred embodiments of the invention as described herein. Specifically, computer 250 may comprise a physically small computer such as used in a cell phone or a large computer system known to those skilled in the art that is capable of being configured for use with the preferred embodiments of the present invention as described herein. This includes tablet computers (e.g., iPad), mobile phones with an appropriate "app," pen-based computers, and the like. It should be noted that no specific operating system or hardware platform is excluded and it is anticipated that many different hardware and software platforms may comprise computer 250.

Additionally, various hardware components (e.g. external drives, printers, etc.) and software components (e.g., web browsers, reporting software, communication software, etc.) known to those skilled in the art may be used in conjunction with computer 250. It should be noted that in the most preferred embodiments of the present invention, computer 250 is communicatively coupled (via wired or wireless connection) to its own LAN or WAN and the Internet and has access to one or more additional computers such as cloud-based data storage server (not shown this FIG.).

Computer 250 will typically contain one or more microprocessors or central processing units ("CPU") and a memory 260 that suitably contains an operating system 261, one or more databases 262, an RFID interface 263, and an inventory mechanism 264. RFID interface unit 263 is provided as a hardware/software combination that is used to receive and aggregate RFID information from multiple RFID readers/scanners 220 and 230 so the RFID information can be transferred to computer 250 where it will processed and analyzed by inventory mechanism 264. The term "memory" as used herein refers to any storage location in the virtual memory space of computer 250. The microprocessor associated with computer 250 performs computation and control functions for computer 250, and most preferably comprises a suitable central processing unit (CPU). The processor may comprise a single integrated circuit, such as a microprocessor, or may comprise any suitable number of integrated circuit devices and/or circuit boards working in cooperation to accomplish the functions of a processor or CPU. The processor is configured to execute one or more software programs contained within memory 260. It should be understood that the present invention applies equally to computer systems having multiple processors and any connection means that supports bi-directional communication in a computer-related environment could be used.

It should be understood that the memory for computer 250 might not necessarily contain all parts of all components shown. For example, portions of operating system 261 may be loaded into an instruction cache (not shown) for processor to execute, while other files may well be stored on magnetic or optical disk storage devices (not shown). In addition, although database 262 is shown to reside in the same memory location as operating system 261, it is to be understood that memory 260 may consist of multiple disparate memory locations. It should also be noted that any and all of the individual software mechanisms or components shown in memory 260 might be combined in various forms and distributed as a stand-alone program product. Finally, it should be noted that additional software components, not shown in this figure, might also be included.

Operating system 261 includes the software that is used to operate and control data server 130. In general, processor 210 typically executes operating system 221. Operating system 221 may be a single program or, alternatively, a collection of multiple programs that act in concert to perform the functions of an operating system. Any operating system now known to those skilled in the art or later developed may be considered for inclusion with the various preferred embodiments of the present invention.

Database 262 is representative of any suitable database known to those skilled in the art. In the most preferred embodiments of the present invention, database 262 is a Structured Query Language (SQL) compatible database file capable of storing information relative to various items that may be of interest to the users of the various preferred embodiments of the present invention. In the most preferred embodiments of the present invention, database 262 will comprise a plurality of information elements (tables, records, reports, customer information, inventory information, etc.) that may be useful to an organization that or individual who wants to perform inventory tracking and management activities in conjunction with a preferred embodiment of the present invention.

For example, database 262 will in most preferred embodiments contain information about the identity and background of linen service customers as well as the specific inventory items associated with each linen service customer, processing and delivery schedules, etc. Since RFID readers/scanners 220 and 230 may be placed or stationed in any location where inventory items 150 are being processed, it is likely that additional RFID interface units 263 may be located within a given linen processing facility, depending on the size and layout of the linen processing facility.

Inventory mechanism 264 is a software mechanism that is used to track and manage the flow of inventory items 150 from the point in time when a specific item is entered into inventory, processed for shipment to a linen services customer, used by the customer, returned to the linen processing facility for renewal and, ultimately, disposed of and removed from inventory. Inventory mechanism 264 is used to track and manage inventory items 150 throughout the life cycle. Additionally, inventory mechanism 264 is configured to generate reports that can be used for reporting, billing, inventory management, etc. Sample reports are shown in conjunction with FIG. 6-FIG. 11. Those skilled in the art will recognize that the sample reports are merely representative of the many types of reports that may be generated.

For example, the most preferred embodiments of the present invention will comprise a reporting system utilizing a combination of hardware and software to query, analyze, and present data regarding inventory items 150 as well as the linen services customers and their use patterns. In at least one preferred embodiment of the present invention, a different software program and/or programming language may be used for different functions to maximize efficiency and flexibility. In this embodiment, the inventory item 150 data comes directly from RFID tag scanning systems through the database and includes RFID tag unique serial numbers, times scanned and for clean linen scans, the associated customers. This information is stored in a SQL database and can be queried by the inventory mechanism using standard SQL programming techniques. Those skilled in the art will recognize that other database software could instead be used.

Because the statistical analysis used for most preferred embodiments of the present invention can be quite detailed, special software specifically designed to support statistical analysis may be used. For example, the "R" computer language system is used in one or more preferred embodiments of the present invention for statistical analysis processing/computing. The "R" programming language is a GNU project and may be licensed at no charge under the GNU General Public License. Within "R," various utility packages are available to facilitate connection to a database. The RODBC package in "R" provides the ability to utilize an ODBC connection and write database queries to a SQL database all within the "R" environment. Using this or a similar software package provides an efficient way to access, compile, and display the data in a dynamic, interactive mode related to inventory items 150.

The use of fractional tagging as described herein will generally drive the use of statistical processes to identify and understand trends in data and make conclusions and predictions. The interface in this example uses the following packages in "R" for data analysis. For this example, a) qcc—allows for development of quality control charts; b) survival—creation and presentation of survival objects to predict waiting time until an event (in this invention it is often waiting time until certain linen items are returned); c) ggplot2—presentation of data using advanced graphing techniques.

To most effectively present trends in the data related to inventory items 150, the data may be reported through an interactive web interface. The interface used here utilizes a software reporting package called Shiny, which was developed by R studios, a commercial software developer providing both open source software for a limited, small number of users as well as commercial software package for a more robust environment with multiple users. In either format, the shiny package includes a considerable number of pre-built widgets and tools to allow the user to interact with data. Shiny also allows for the development of packages and use of programming languages such as java script to increase customizability. Beyond R and Shiny, there are other programming tools available to develop an interactive interface. One example of this is "D3," a java script library that uses a combination of HTML, CSS, and SVG to create interactive charts and graphs.

Development of this interface also requires a server computer to host the web application where the data is being presented. Rstudio Server (popular Integrated Development Environment Package, IDE, for R) and shiny are most compatible with Linux. Configuration of a Linux server will enable the development and presentation of a Shiny interactive web interface.

Figure 3:
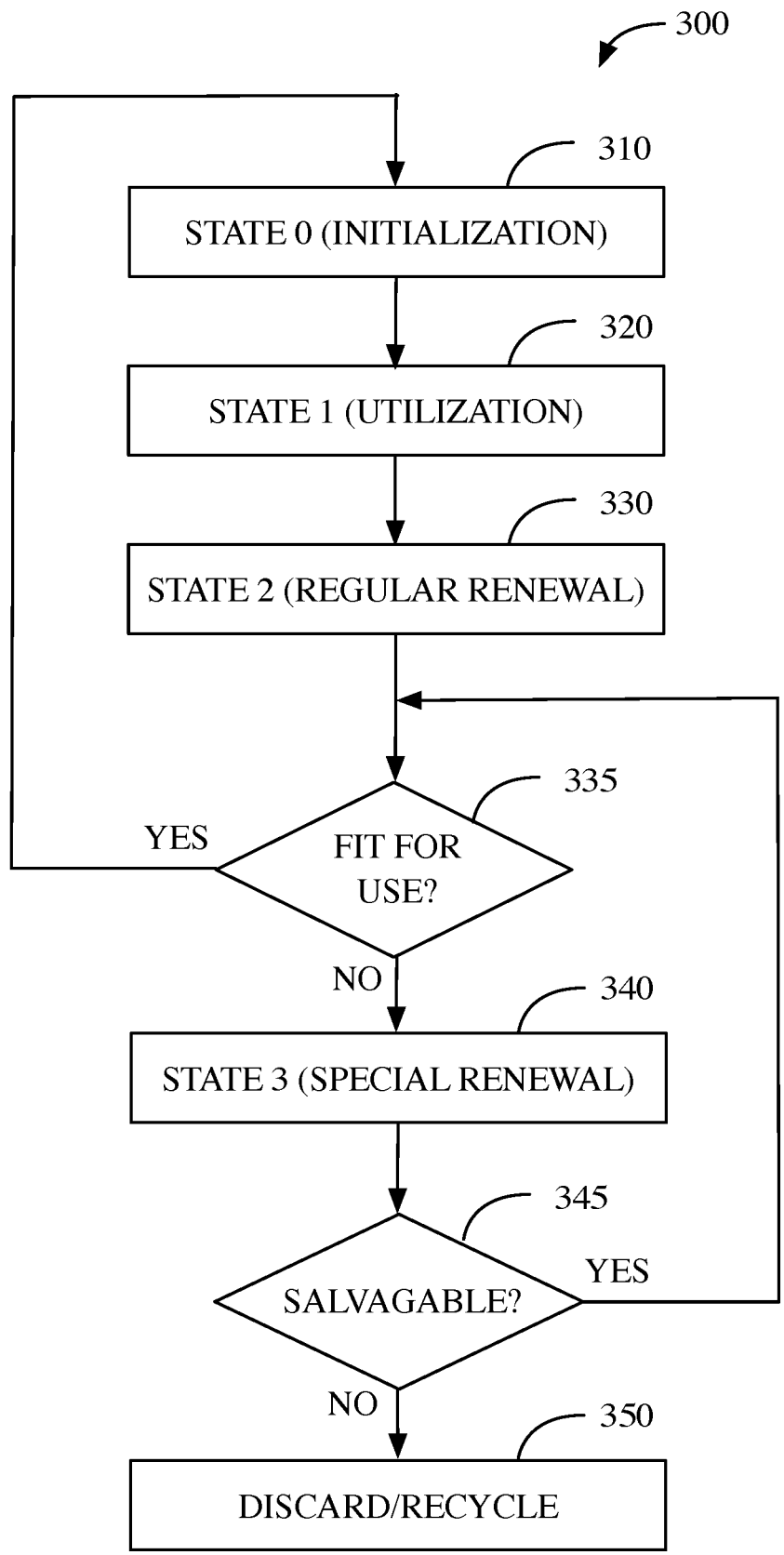
FIG. 3 is a diagram of the process flow model for a fractional inventory tracking and management in accordance with a preferred exemplary embodiment of the present invention.

Referring now to FIG. 1 and FIG. 3, a diagram of a process flow model 300 for implementing and operating a fractional inventory tracking and management system in accordance with a preferred exemplary embodiment of the present invention is depicted. As shown in FIG. 3, there are typically four states in the most preferred embodiments of the present invention.

State 0, "INITIALIZATION", describes the state where the linen inventory items are assembled for customer delivery, have been clean scanned to a specific customer to be delivered on a specific day and are waiting at the plant for the transport of the items to the customer.

State 1, "UTILIZATION" describes the activities once inventory items 150 have been delivered to a customer facility for use by the customer. This includes inventory items 150 that are i) in customer clean storage ready for immediate use; ii) inventory items 150 that are actually in use by the customer's staff in the discharge of their responsibilities to serve their customers; and iii) inventory items 150 that are stored in a soiled or damaged condition waiting for pick up and delivery back to the linen processing facility.

State 2, "REGULAR RENEWAL" describes the regular linen processing activities that are used to process inventory items 150 that have been used and soiled to prepare inventory items 150 for return to and subsequent use by the same or a different customer. State 2 starts when items are transported back to the linen processing facility 140, and includes the activities after inventory items 150 are delivered to the linen processing facility 140 where inventory items 150 are cleaned; provided additional special cleaning activities, if necessary, State 3; folded, stacked, hung, and prepared for delivery to the customer's facility 110 or 120.

State 3, "SPECIAL RENEWAL" describes specialized or remedial processing of inventory items 150 that require attention over and above standard washing, pressing, and finishing to be properly prepared for re-use. Inventory items 150 identified for SPECIAL RENEWAL include inventory items 150 that require stain removal, sewing or other repairs, or even re-manufacturing to create smaller inventory items 150 if a damaged section is not repairable (e.g., cutting napkin sized squares of fabric out of a defective tablecloth and finishing the edges for use as one or more napkins).

In the most preferred embodiments of the present invention, States 0, 2, and 3 include routine scanning processes to assign the new RFID tagged textile items with their specific identity for computerized record keeping via computer 250, to establish and record to whom each item 150 is being delivered as well as the number of untagged items represented by each RFID tagged item of like inventory items 150. For example, given that the most preferred embodiments of the fractional tagging invention use the optimal number of RFID tags possible, which is typically around 5% of the entire inventory, each RFID tagged inventory item 150 is representative of itself plus some nineteen or so additional inventory items 150 associated with each tagged inventory item 150.

This allows the linen processing facility to: i) establish when inventory items 150 have been returned from the last use and are ready for processing to prepare them for re-use; ii) identify inventory items 150 that are still stained after a first wash; iii) identify inventory items 150 that are either still stained after a second more rigorous wash or damaged in a way that renders that inventory items 150 unfit for further use, likely necessitating billing the last user of the item, and, finally; iv) de-assign an item that is not fit for continued use and cannot reasonably be made fit for use (e.g., removal from inventory) which also represents some larger number of inventory which is over time accurately projected by fractional tagging.

For State 1 scanning, only special scanning processes typically with a hand scanner, item 230, are used to determine whether inventory items 150 that are overdue in being returned to the linen processing facility (e.g., "management by exception") are still at the customer's facility or are actually missing.

As previously explained, for accounting purposes each time an RFID tagged inventory item 150 in State 0 is sent to a customer for use, the tagged inventory item 150 represents itself and a number of like items that were not tagged but that were shipped with the tagged inventory item 150. If that tagged inventory item 150 is not returned to the linen processing facility, the unreturned tagged inventory item 150 represents not only itself as delayed, missing, or lost, but, in addition the number of untagged items that the single tagged inventory item 150 represented when it was last scanned and sent to the customer clean and ready for use.

Normally, even small quantity linen services customers use enough textile products of at least one type that the accumulated number of sent for use items is large enough within a matter of a few weeks, that the tracking of the movement or lack of movement of the tagged RFID items from State 0 to State 1 to State 2 and if necessary to State 3 becomes reasonably accurate if not highly accurate in establishing the total number of items lost, abused, or stored and not used for longer than expected and/or desirable while in the customer's custody. This number will vary for each linen services customer and will be stored in database 262 and tracked by inventory mechanism 264.

Besides the management by exception example above for hand scanning inventory at the customer's in State 1 where the linen service is looking for inventory that it has determined through the RFID tag system is either lost or delayed in use and return, periodically, the portable RFID tag scanner 230 may be brought to the linen services customer facility to conduct more detailed analysis and review of inventory items 150 on a regularly scheduled or "as-needed" basis. The use of a portable RFID tag scanner 230 at the linen services customer facility may be triggered by an automated computer search and analysis process or by a analysis conducted by the linen processing facility staff looking for a significant condition or conditions impeding efficient and effective use of inventory items 150 at a certain customer. A portable RFID tag scanner 230 may be used to find, if possible, those inventory items 150 that are still in the customer's custody and then to confirm the number of missing inventory items 150 lost while in the customer's custody since the previous customer premise scanning or inventory accounting.

Routine analysis of the special processing required for RFID tagged inventory items 150 during State 3 can be used to identify excessive customer misuse of inventory items 150 that can create significant waste and/or indicate "hard" use which causes premature inventory retirement and raises the linen processing facility's cost of service above what was anticipated or properly budgeted. By identifying these conditions, the linen processing service provider can be alerted to the problems at specific customers and address the issues so as to be properly compensated in some way to avoid immediate and/or continued financial loss for the linen service provider and to help the customer prevent similar loss in the future and avoid the charges to compensate the linen service for its excessive costs of operation caused by the customers' misuse or loss of inventory.

As set forth herein, the fractional tagging information produced by the scanning activity and specialized software coding used in the most preferred embodiments of the present invention can reliably and accurately identify situations where customers should be billed for lost inventory, for abused inventory, and for carrying excessive stock of the linen service's inventory (e.g., "stockpiling"). These practices raise the cost of doing business for the linen processing service provider and its customers. These practices, once identified, will typically generate addition charges to be billed to the appropriate customer, thereby providing appropriate incentives for the customer to change its practices in order to reduce its costs incurred solely due to wasteful and generally avoidable practices.

The substantial detail and high level of information accuracy generated by the RFID tag scanning and special computer software data processing described herein enables the linen service provider to identify customers with significant opportunity to reduce linen usage and storage waste and thereby reduce its operating costs. The customer and its linen service provider are able to analyze the cost and cause(s) of waste, identify the staff practices and business processes which need to be changed to eliminate the waste, and the cost of eliminating the cause(s) of waste. At that point, developing and implementing an effective action plan to eliminate waste is usually highly productive for the customer and linen service provider.

As shown in FIG. 3, State 0 (step 310) is where RFID tagged linens and non-tagged linens at the linen processing facility have been processed, packaged, and set aside for delivery to a specific customer. At this point, inventory items 150 are scanned to identify and record the tagged items and the customer to whom the inventory 150 will be delivered, with that customer being charged with the care and safekeeping of the items while they are in the customer's custody. Once the order has actually been delivered to the customer and the linens are available for use at the customer's facility, those inventory items 150 are in State 1 (step 320).

When inventory items 150 are returned to the linen processing facility, the inventory is in State 2 (step 330). All returned inventory items 150 are processed for reuse. This typically includes washing, pressing, packaging, etc. In most cases, inventory items 150 are also inspected for excessive stains, rips, tears, etc. to determine whether the individual inventory items 150 are suitable for reuse (step 335). If inventory items 150 are fit for continued use (step 335="YES") then inventory items 150 are returned for State 0 (step 310) and can be sent back out to a linen services customer.

If inventory items 150 are not fit for continued use (step 335="NO") then inventory items 150 are moved to State 3 (step 340) and can be repaired, hand washed, stain treated, remanufactured, etc. At this point in time, inventory items 150 can be inspected yet again and, if salvageable (step 345="YES"), then inventory items 150 are returned to State 0 (step 310) and can be sent back out to a linen services customer or may be returned for additional renewal (step 335) and eventually returned for State 0 (step 310) where they can be sent back out to a linen services customer. If not (step 345="NO"), inventory items 150 can be discarded or recycled, etc.

Figure 4:
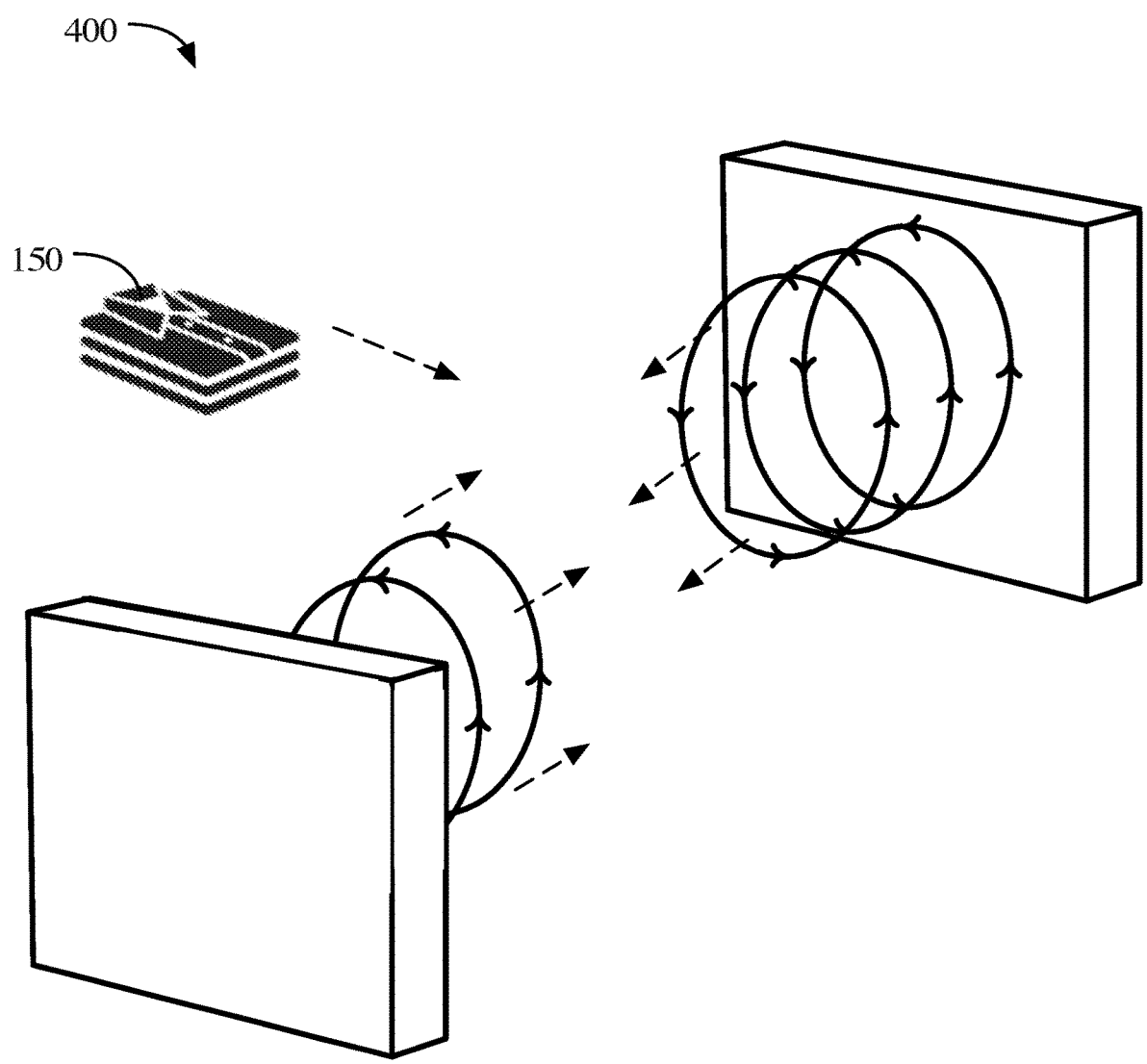
FIG. 4 is a diagram for fractional inventory tracking and management in accordance with a preferred exemplary embodiment of the present invention.

Referring now to FIG. 4, a possible RFID antennae array 400 in accordance with a preferred embodiment of the present invention is depicted. As shown in FIG. 4, a number of specific RFID antennae 410 are placed in specific locations for optimal results. For most processing activities, an RFID clean scan station with ultra-high frequency antennae collectively capable of hundreds of reads per second of RFID tags within the scanning field and generally a radius of about 25 feet is located at an appropriate place in the linen processing facility to minimize the interference of reading RFID tags that are in the scanning field, but, which are not intended for delivery to the specific target customer. The inventory items 150 will be processed through the "scanning tunnel" created by RFID antennae array 400 so that the RFID tags can be read.

Possible non-target RFID tag interference is prevented by ensuring that items are outside of the boundaries of the potential scanning field as determined by distance where practical and where distance alone is impractical such as in close quarters, then by 1) blocking scanning in certain directions by placing metal or other RFID barrier material shields between the line of sight antennae and potential non-target RFID tags otherwise located within the scanning field and 2) by taking "snapshots" of the scanning field for certain periods of time that typically range from a few seconds to a half minute prior to scanning the target batch of linens so that the items found in the scanning field prior to scanning the target cart are disregarded by inventory mechanism 264 and not included as the items that are scheduled for delivery to the designated specific customer.

In one preferred embodiment of an RFID scanning station, the scanning station comprises eight antennae at least equivalent in capability to the Laird Technologies circular polarity RFID panel antenna, S9028PCL for left hand, counterclockwise signal rotation, and S9028PCR for right hand clockwise signal rotation, four each connected to a RFID tag "reader" at least equivalent to the Impinj Speedway Revolution Reader. Generally, the configuration of these antennae will be with the antennae facing each other and having the opposite polarity so that the radio frequency waves are spiraling in the same direction between the two antennae, as shown in FIG. 4.

In the most preferred embodiments of the present invention, there are at least three antennae positioned on a vertical column facing an opposing vertical column of three additional antennae plus two antennae positioned on a horizontal plane approximately eight feet above the floor. The two antennae on the horizontal plane are facing slightly forward in order to increase total scan reading time while an order of linens placed in a container of plastic or other type of material that is invisible to the RFID antennae signal as the target linens move into the scanning field, through the "scanning tunnel," and then out to a staging area or loaded into a delivery vehicle.

Additionally, up to four antennas may be attached by signal cable to the antennae reader where the signals received form the RFID tags embedded in the linens are interpreted and coded appropriately for "serial number" transmission to a computer which accesses software programs that interface with an operator to enable target customer selection and commencement of scanning activities. At scanning commencement, the operator ensures that the target cart is outside of the scan field. Immediately after scanning commencement, the target cart is introduced into the scanning field. The system then scans for a minimum amount of time (approximately fifteen seconds) and terminates the scanning process once it goes five straight seconds without a new tag read following the initial ten seconds of scanning. The time intervals for the clean scan quality assurance steps above and below are estimations for a typical user and can be changed to suit the purposes and unique circumstances of any individual linen service.

The system generally considers a minimum of 15 seconds without a new tag being read as a completed "snapshot" of the scanning field. All items, if any, in the snapshot are ignored during scanning of the target cart immediately following the snapshot. Once scanning begins of the target cart, the scan continues until the first tag of the target order is read plus as long as it takes to achieve at least five seconds of no more tags identified during scanning to help ensure that all RFID tags in the target container which always has an RFID tag identifier within the scan field have been read. Once a tag is scanned and recorded for delivery to a specific customer, it will be ignored during all other clean scanning activity for 24 hours unless it is in the mean time processed as a return item or clean scan reversal.

If items are identified as being in the target cart that are inconsistent with the Customer's order, such as completely different items or items in larger quantities than reasonably expected, then an error condition is reported along with specific details, such as what items have been scanned that are inconsistent with the customer's order.

In that case the software is switched to a mode facilitating the location of the incorrect items. This process can be effected in a station designed for efficiently identifying the offending tags, "offending" meaning any tags that are inconsistent with the items specified in the customer order. In the most preferred embodiment of the present invention, a clean scan station can also be modified through software so that only a single antennae of the normal eight is functioning and the single functioning antennae can be temporarily, partially covered by a movable "blinder" so that the antennae can only see tagged items after they are removed from their cart and placed in a new cart. This process enables the offending tagged items to be found in a certain bundle. Once a bundle is located with an offending item(s), the bundle is halved and then halved again repeatedly with any half portion registering an offending item(s) halved and checked again until all offending items have been located and set aside for corrective action. If necessary, additional bundles are similarly screened to identify offending items.

The original cart or the new cart if the balance of the inventory in the original cart is more easily transferred to the new cart is re-scanned following the offending item(s) being removed from the rest of the order and replaced with correct items if needed. The ratio of non-tagged items to a specific tagged item on the last customer delivery is the best single predictor of how many untagged items will be represented by a specific tagged item at this point. After the order is accepted as correctly assembled and recorded, the total pieces of an order, tagged and not tagged are compared to derive the ratio of untagged items to each tagged item and the new ratio will then apply to each RFID tag in the order until the items go through use, State 1, State 2, State 3 if needed, and State 0, renewal including a new clean scan.

The system also catches instances when the total number of tagged items appears sufficiently inconsistent with the order to have been accurately filled, either significantly too many or too few tagged items have been scanned to be reasonably consistent with the order quantity which the production department indicated were assembled for delivery in the cart(s) scanned for the customer's order. The system uses statistical analysis to ensure that within a linen service selected confidence level, for example at least a 99% probability the scanned pattern would happen randomly are consistent with the order quantity for a single filled item as reported by personnel at the linen processing facility. To ensure that a possible "slug" of RFID tags introduced for the first time do not lead inventory mechanism 264 to a false conclusion (e.g., indicating that more of an item has been assembled for the delivery than have been confirmed by order assembly staff) newly assigned tags not previously clean scanned are typically ignored in this analysis.

A similar process checks the credibility of the tagged proportion of linen items returned for credit. If the linens returned to be credited are scanned and the number of RFID tagged items are inconsistent with the number of items returned for credit or if some or all of the returned tagged items are recorded as having been last sent clean to a different customer, an appropriately worded error notice is displayed requiring management intervention to determine whether the items and quantities requested for credit actually should be credited.

Before updating the database with the clean scan data, the ratio of tagged items in any one delivery to all items in the same delivery for any one specific item type (SKU) is calculated. Following successful scanning, the physical order is stored for subsequent transportation to the proper customer.

Generally a customer facility does not need to have scanning stations located on its premises and instead the permanent scanning stations are located only at the linen services processing facility. Typically, RFID tag scanning is only done at the customer's facility when searching for items that are likely missing as they have not been returned by the customer to the linen processing facility in a normal or reasonable period of time as expected by the linen processing facility. In these instances a mobile RFID scanner 230 can be used at a customer's location to search for the "missing" inventory. All known areas where the linens are kept, clean, in use (as practical), soiled, and as deemed appropriate other areas that are suspected of possibly holding linens are scanned with the hand scanner to find missing items.

Prior to the mobile unit scanning at the customer's facility, the linen processing facility downloads to the hand scanner, the records of the items that have been charged to the customer through clean scanning that have not yet been returned to the linen processing facility including the date each item was sent. The scanner has a program that enables it to compare the items found with tags against the list of suspected missing items while on the customer premise so that the operator of the scanner can stop scanning as soon as all "missing" items are located, if that is accomplished before all areas known to have textiles have been scanned.

The results of the scanning effort, primarily a list of the items verified as missing, can then be reviewed with the linen processing facility customer including a projection of the total suspected missing inventory represented by the missing tagged inventory net of any tagged items found during the mobile scanning on the customer premise. The projection of total items missing is stated in terms of number of RFID tagged items not found times the ratio of untagged items to missing tagged items for the specific delivery in which each lost tagged item was delivered to the customer.

The linen service representative and the customer's representative following the on customer premise search for missing items then know the magnitude of the problem and having an opportunity to establish when the missing items were delivered to the customer are able to begin analyzing the data to try to determine a pattern of loss that that could help point to an effective course(s) of action to minimize or eliminate future loss.

For example, if lost linens occurred at an unacceptably high rate up until the beginning of a certain year and on the last day of the year the soiled linen storage area was relocated from a linen storage area where the public had access to the stored soiled linens to a linen storage area where the public had no access, if thereafter no (or comparatively very few) linens delivered after the first of the year were later identified as missing, then it would be reasonable to conclude that securing the soiled linen storage area had solved the problem of losing linens. This would tend to indicate that the linen loss was with soiled linens rather than clean linens.

Similarly, If an entire cart was missing as well as all of or many of the linens that were delivered in that cart, and no other linens were missing, then the indication would be that a whole cart or partial cart of clean linens was removed from the property or that the entire cart or remaining amount after partial unloading including its missing linens had been misplaced at the customer's location. A third example, if only one type of item accounts for all of the loss and this one type of item was delivered in more than one cart, this situation indicates that likely intentional theft of clean linen is responsible for the loss, theft possibly by the staff of the linen service's customers. A fourth example, if various types of RFID tagged items are lost in an approximately equal proportion to the number delivered, then loss through unintentional discard or theft of bags of soiled linens rather than theft of clean linens would be suspected.

Following this analysis, the linen processing facility representative and the customer representative are able to discuss means of loss prevention appropriate to eliminate or minimize the type of loss apparently occurring. For instance, if the loss appears to be due to linens being discarded unintentionally, the solution would probably include re-training customer staff to be aware of the value of the linens, setting up systems or changing systems to reduce risk of discard, and as helpful changing the physical layout of the facility (possibly move a soiled linen container adjacent to a dumpster bin to a location further away from the refuse dumpster to eliminate the risk of soiled linens accidentally dropping into the refuse dumpster instead of the soiled linen container).

Referring now to FIG. 5, a table is used to illustrate the scoring process used to identify the appropriate percentage of inventory items to be tagged, based on the information contained in Table 1 and Table 2. As shown in FIG. 5, four representative linen inventory items are shown. These items are a mop towel, a black napkin, a 66"×120" rectangular tablecloth, and a 120" round tablecloth. Each of the four inventory items is "scored" using the criteria established in Table 1 to obtain a score for that inventory item. Once the total score is calculated for a given inventory item, the total score can be converted to a % indicating the number of inventory items that should be tagged with an RFID chip. For example, the black napkin inventory item received a total score of 45 points which, when Table 2 is referenced, indicates that 3% of the total black napkin inventory should be tagged with an RFID chip. For a black napkin inventory of 300,000 items, 9,000 of the black napkins will be tagged with an RFID chip. Similar calculations can be performed for the other inventory items.

At certain types of customers, rapid and consistent movement from clean delivery, clean storage, use, soiled storage, and return to the linen processing facility for re-processing improves linen usage safety. The prime example is the acute care hospital. The longer linens sit in areas potentially at risk of deposit of air borne potentially infectious bacteria and spores, the greater the risk for the patients who are often in a weakened resistance state while being in an environment typically rich with infectious diseases.

Referring now to FIG. 2 and FIG. 6-FIG. 11, a series of schematic graphical representations illustrating the various types of graphs that may be produced by inventory mechanism 264 of FIG. 2 are depicted. The graph in each FIG. is based on an example for a restaurant linen service operation where linens for a plurality of separate restaurants are processed at a single linen processing facility. Each of the graphs shown in FIG. 6-FIG. 11, may be produced and displayed on the screen of computer 250. Each of the graphs is created using the data stored in database 262 with the date being processed for decision-making purposes because the data can identify trends associated with linen use, abuse, theft, etc.

Figure 6:
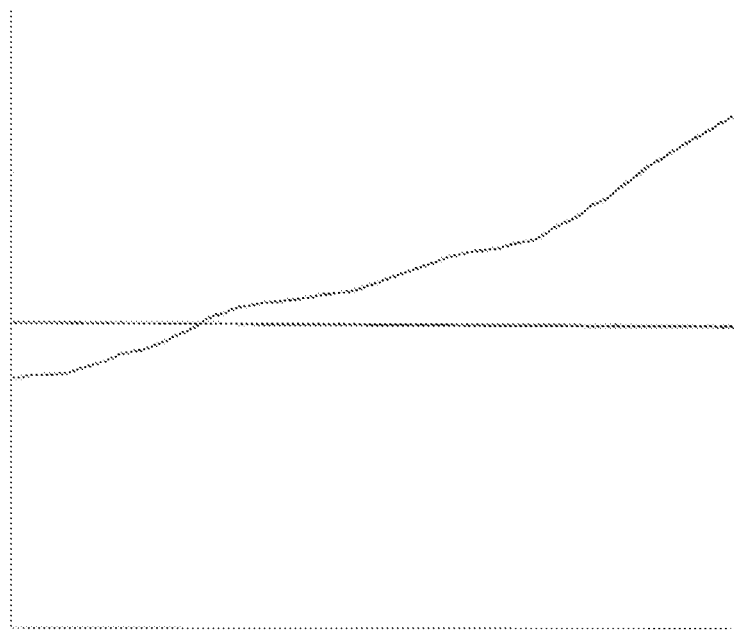
FIG. 6 is a graphical or schematic representation of an inventory item report for decision-making using a fractional inventory tracking and management system in accordance with a preferred exemplary embodiment of the present invention.

Referring now to FIG. 6, a graphical representation of average inventory value at new cost vs. average weekly linen service billings for the time period Jan. 1, 2014-May 1, 2015 is depicted. In this example, a highly successful restaurant linen service customer is purchased by a new owner as of Jan. 1, 2014. The new owner has little experience in the restaurant business. The restaurant under the previous ownership was tightly and professionally run. The ratio of inventory at new cost on premise at a typical restaurant on average is equal to 3.95 times the average weekly linen service billings. Under new, less experienced management this restaurant's average value of inventory tied up increased to a 6.05 multiple of average weekly linen service billings from an average of 3.58 in 2013. The trend began by mid January and moderately continued to rise through June of 2014. Some of this increase is attributed to lost inventory that needs to be billed to the restaurant and the inventory charged out to the restaurant commensurately reduced. Inventory not returned after clean delivery within 120 days has approximately a 99% probability of not being returned at any point in the future.

A single inventory item display mode can also be selected in which case a specific inventory linen item will be displayed with related data instead of the default mode reporting for all inventory values and linen service billings.

Figure 7:
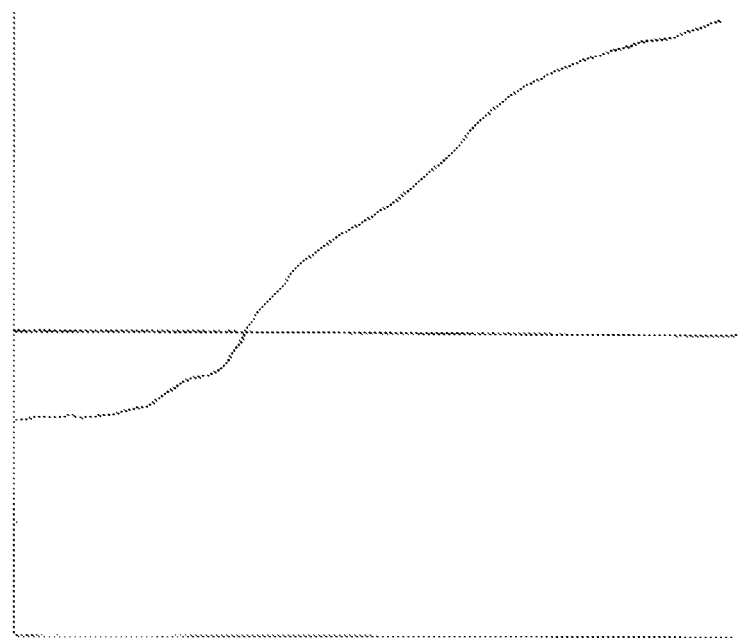
FIG. 7 is a graphical or schematic representation of an inventory item report for decision-making using a fractional inventory tracking and management system in accordance with a preferred exemplary embodiment of the present invention.

Referring now to FIG. 7, a graphical representation of the average number of days of linen inventory on hand at a restaurant customer for the time period Jan. 1, 2014-May 1, 2015 is depicted. In this example, a highly successful restaurant linen service customer is purchased by a new owner as of Jan. 1, 2014. The new owner has little experience in the restaurant business. The restaurant under the previous ownership was tightly and professionally run. Inventory was generally handled on a just in time basis.

During 2013 and through the first month of 2014, the number of days of average inventory use of linen inventory on hand at any one time averaged 4.6 days for the twice per week served restaurant which compared favorably to the 5.9 days average inventory on hand for the average twice per week served restaurant. By early March, however, the inventory on hand climbed to 5.9 and kept on increasing so that by the end of June, there was 11 days of inventory on hand on the. Some of these linens that the linen service records show delivered to the restaurant had likely been lost, but, not yet identified as lost, which generally is considered over 99% likely if an item is not returned in 120 days after clean delivery.

A single inventory item display mode can also be selected in which case a specific inventory linen item will be displayed with related data instead of the default mode reporting for all inventory loss activity.

Figure 8:
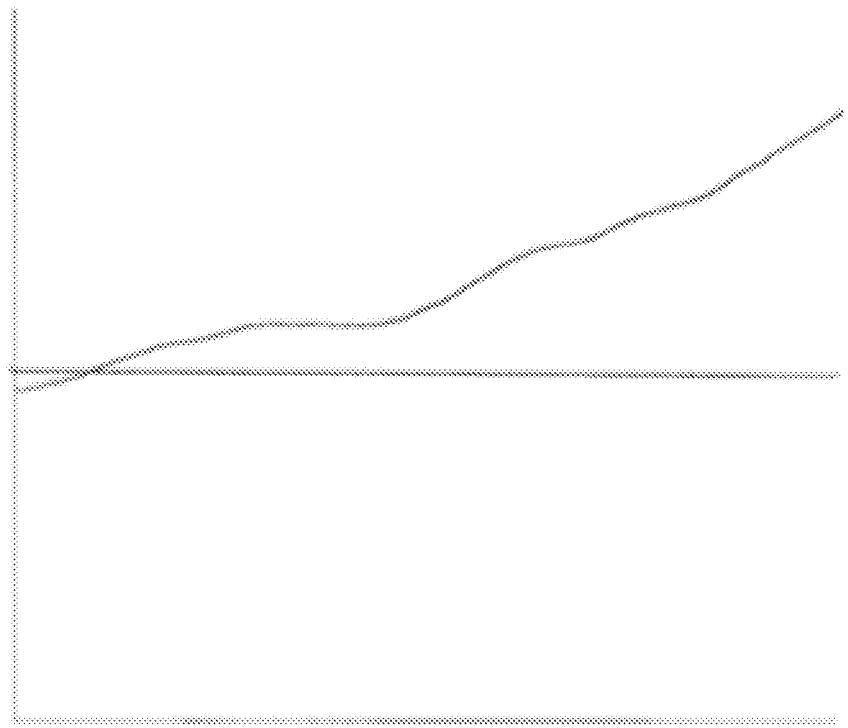
FIG. 8 is a graphical or schematic representation of an inventory item report for decision-making using a fractional inventory tracking and management system in accordance with a preferred exemplary embodiment of the present invention.

Referring now to FIG. 8, a graphical representation of the average remaining life expectancy of items lost, chart for the time period Jan. 1, 2014-May 1, 2015 is depicted. In this example, a highly successful restaurant linen service customer is purchased by a new owner as of Jan. 1, 2014. The new owner has little experience in the restaurant business. The average remaining life expectancy of item lost during 2013 and beginning 2014 was just under 50%, but, not sufficiently under 50% to be statistically significant. Absent customer employee theft, it is expected that items that are lost tend to be average age items, about half used versus their life expectancy when brand new and first put into service.

This restaurant's average remaining life expectancy of items lost during 2013 averaged a little less than 50% and was at a similar level during the first few days of 2014. However, within a few days this began to climb significantly, seemed to stabilize in March, then started increasing again in April fairly sharply to the point where the average remaining life expectancy of items lost was about 80% meaning that new and newer items were being lost at a much higher rate than normal. This is most likely a result of restaurant employee theft. Only restaurant employees generally have the opportunity to pick through linens and remove and pilfer the best and newest linens.

A single inventory item display mode can also be selected in which case a specific inventory linen item will be displayed with related data instead of the default mode reporting for all inventory loss activity.

Figure 9:
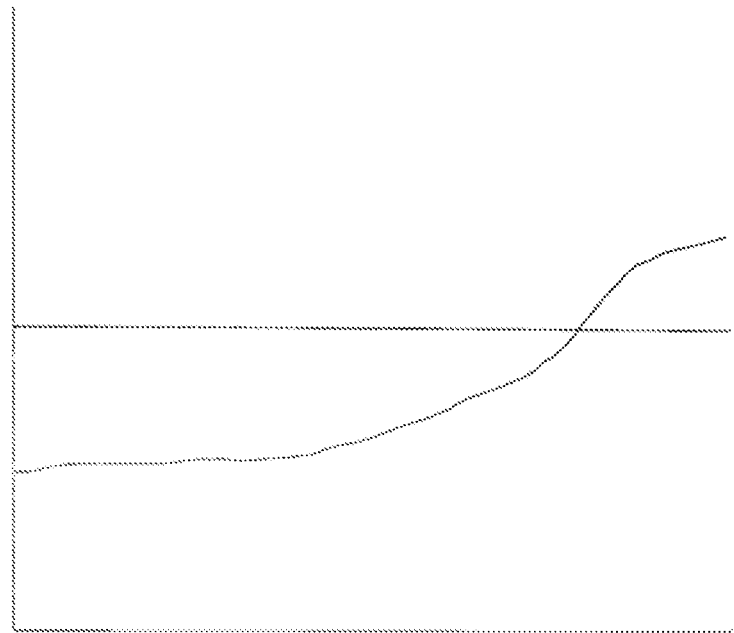
FIG. 9 is a graphical or schematic representation of an inventory item report for decision-making using a fractional inventory tracking and management system in accordance with a preferred exemplary embodiment of the present invention.

Referring now to FIG. 9, a graphical representation of linen abuse frequency for the time period Jan. 1, 2014-May 1, 2015 is depicted. In this example, a highly successful restaurant linen service customer is purchased by a new owner as of Jan. 1, 2014. The new owner has little experience in the restaurant business. The rate of linen abuse from the restaurant's premise was about 0.5% in 2013, which was about half of the average abuse rate for all other customers. This rate stayed low through the middle of March and then started to climb dramatically to 1.2% slightly over the average customer's abuse rate of 0.5%.

By first selecting an interval, such as week or month, and second placing the cursor over any point on the trend line, the reporting system displays the amount of linen abuse in that immediate past interval in both units and total dollar value.

A single inventory item can also be selected in which case a specific inventory linen item will be displayed with related and similar abuse frequency data instead of the default mode reporting for all inventory abuse activity.

Figure 10:
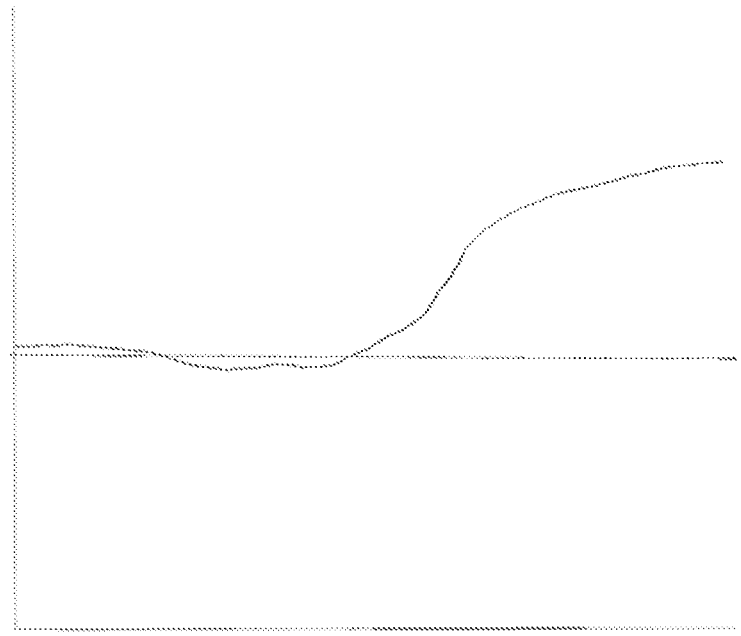
FIG. 10 is a graphical or schematic representation of an inventory item report for decision-making using a fractional inventory tracking and management system in accordance with a preferred exemplary embodiment of the present invention.

Referring now to FIG. 10, a graphical representation of a customer's propensity to lose linens for the time period Jan. 1, 2014-May 1, 2015 is depicted. In this example, a highly successful restaurant linen service customer is purchased by a new owner as of Jan. 1, 2014. The new owner has little experience in the restaurant business. The rate of linen loss from the restaurant's premise begins 2013 at the approximate average for 2013. This rate slightly improves in February and March, but, then begins to increase significantly through the end of June to 4.2%.

By first selecting an interval, such as week or month, and second placing the cursor over any point on the trend line, the reporting system displays the amount of linen loss in that immediate past interval in both units and total dollar value.

A single inventory item can also be selected in which case a specific inventory linen item will be displayed with related data instead of the default mode reporting for all inventory loss activity.

Figure 11:
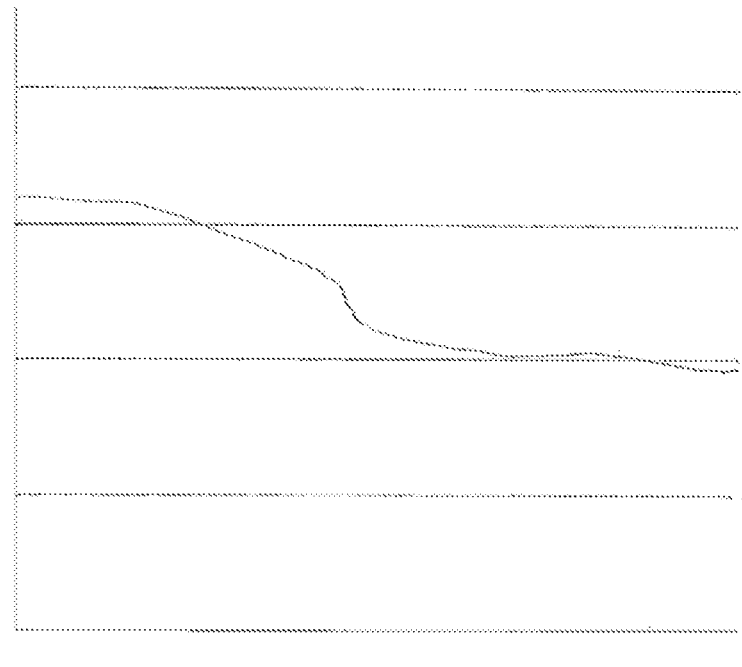
FIG. 11 is a graphical or schematic representation of an inventory item report for decision-making using a fractional inventory tracking and management system in accordance with a preferred exemplary embodiment of the present invention.

Referring now to FIG. 11, a graphical representation of FIFO inventory use adherence for the time period Jan. 1, 2014-May 1, 2015 is depicted. In this example, a highly successful restaurant linen service customer is purchased by a new owner as of Jan. 1, 2014. The new owner has little experience in the restaurant business. The restaurant under the previous ownership was tightly and professionally run. Inventory was generally handled to ensure consistent rotation of inventory. The new inventory was put behind or below the earlier delivered inventory on the storage shelves to help ensure this consistent rotation pattern.

During 2013 the restaurant with the seasoned and competent restaurant management had previously averaged a FIFO score average of 83%. Starting the first few days of 2014, the restaurant was at 80% and continued at that level through the month of January. By approximately the end of March a precipitous decline occurred in adherence to the FIFO standard after a gradual trend away from FIFO. The deteriorating trend continued at a moderate rate through the end of June, 2014.

Figure 12:
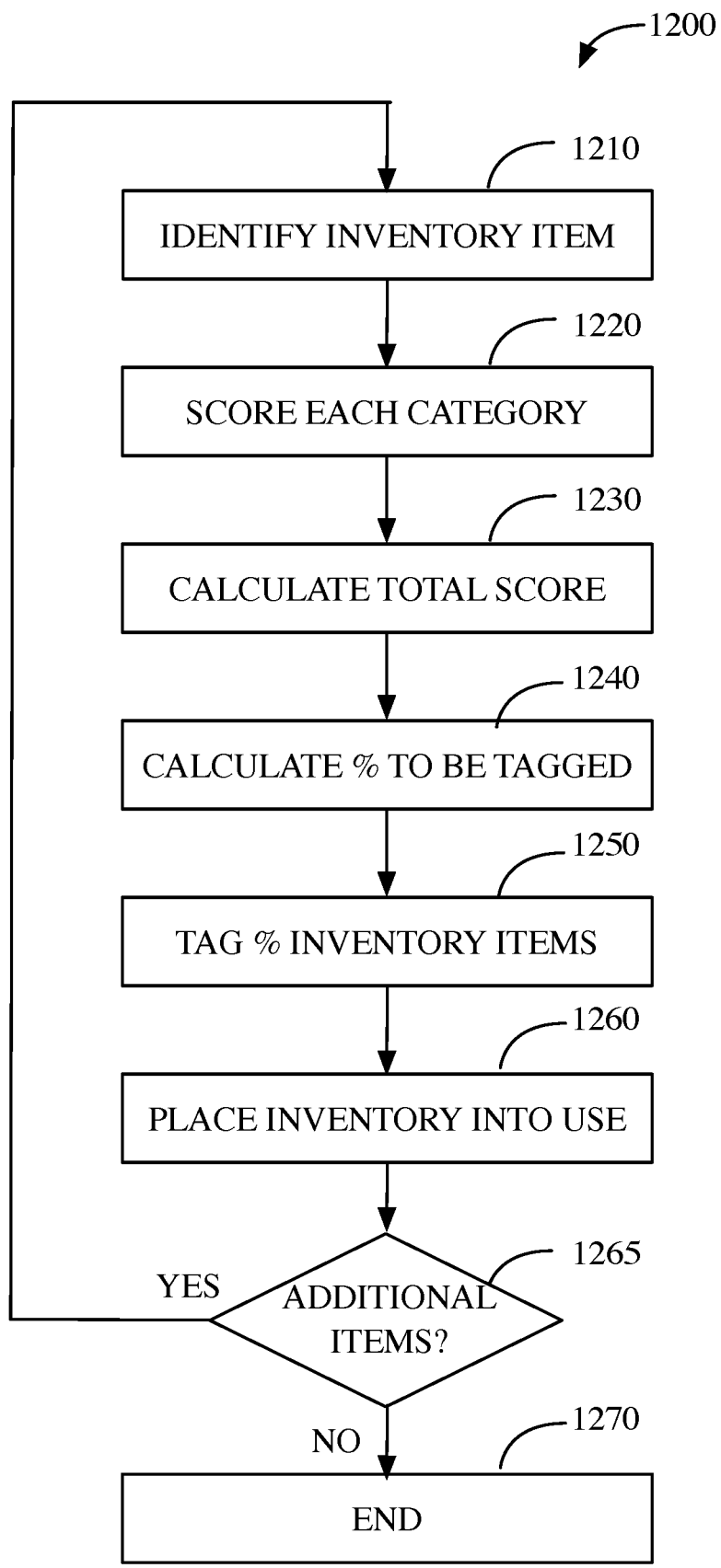
FIG. 12 is a flow chart for a method of scoring inventory items for use in conjunction with a fractional inventory tracking and management system in accordance with a preferred exemplary embodiment of the present invention.

Referring now to FIG. 12, a method 1200 for scoring inventory items for use in conjunction with a preferred exemplary embodiment of the present invention is depicted. As shown in FIG. 12, each inventory item (e.g., a group of substantially similar items in a group of items) is identified (step 1210) and scored, based on the categories shown in Table 1 (step 1220). The individual scores are used to calculate the total score for an inventory item (step 1230) and then, using Table 2, the optimal percentage of the inventory to be tagged can be determined (step 1240). Then, the inventory items can be tagged (step 1250) and the inventory items can be placed into use (step 1260). The process is repeated if there are more inventory items to be evaluated (step 1265="YES") or the process will end (step 1265="NO").

At certain types of customers, rapid and consistent movement from clean delivery, clean storage, use, soiled storage, and return to the linen processing facility for re-processing improves linen usage safety. The prime example is the acute care hospital. The longer linens sit in areas potentially at risk of deposit of air borne potentially infectious bacteria and spores, the greater the risk for the patients who are often in a weakened resistance state while being in an environment typically rich with infectious diseases.

Acute care hospitals use in the area of 15 pounds of linens per patient day. A five hundred bed hospital with an average census plus a typical amount of ancillary and outpatient services is likely to use in the area of three to four million pounds of clean linens per year. Each item of linen is mostly indistinguishable from another of the same type. Once the linens are delivered to the customer and are removed from the linen delivery container, it is difficult or impossible to say which linen items came in when, whether a particular linen item was delivered yesterday or months prior. Hospital environments pose major dangers for patients for hospital-acquired infections making infection prevention a top priority for all hospitals.

*Clostridium difficile* (or "*C. diff*") is a highly infectious and dangerous bacterium that causes numerous serious illnesses and fatalities in hospitals throughout the country daily with approximately a half million illnesses per year and 30,000 deaths being attributed to *C. diff*. In its spore state, *C. diff* is able to survive for long periods in relatively inhospitable environments, such as clean dry linens. Once ingested by the patient, orally or by other means, the spores can return to their bacterium state and can precipitate a *C. diff* infection in the patient and accompanying serious illness. Infection control experts have not yet determined how *C. diff* is so frequently transmitted to patients in hospitals and so, accordingly, all reasonably logical and practical precautions are implemented to limit or prevent the spread of *C. diff*. spores to the extent possible.

Linens are recognized as a potential location for *C. diff* spores to congregate. The surface of most linens are not smooth and the linens are not cleaned or laundered until after the linens are actually used. Without an effective inventory-tracking tool such as an RFID tagging process, it is very difficult to verify that linens are being used in a timely manner. Accordingly, in many environments, unused linens can sit for months on hospital shelves where, if not rotated properly, it is virtually impossible to determine whether linens stored on shelves have been used on a first in-first out basis or otherwise. The preferred embodiments of the present invention provide, for the first time, a relatively robust and practical means of ensuring that linens move rapidly through clean storage to use to eliminate what may be a significant transmission route for *C. diff* infections.

Besides reducing the spread of infections in hospitals, businesses generally desire to have low inventory levels in order to reduce capital investment as well as inventory shrinkage due to theft and waste. Hand scanning of the fractional RFID tagged linens provides the linen user with the practical ability to determine optimal inventory levels, monitor actual levels, and to enforce the practices that ensure maintaining optimal inventory levels.

Following use or identification of textiles to be returned to the linen service due to overstock, discontinued item, defective product, etc., the soiled or clean returned textiles are transported back to the linen processing facility for renewal.

The linens that are soiled or returned for other reasons are scanned for RFID tags after they return to the linen processing facility. The RFID tags identified are recorded in a database that includes a complete history of each tagged item's laundering and customer use. Approximately 95% of the soiled textiles are laundered once and in the single wash are rendered stain free and fit for use. These textile items are finished, such as ironed, pressed, steam tunneled, or tumble dried and then likely hung on hangers or folded, ready for assembly in a customer order, the last step before scanning and transition to State 0, Initialization.

The approximate 2-5% of the textiles that are found to be still stained or damaged after washing are scanned for RFID tags (State 3, Special Renewal Subprocess) and recorded in the database before further treatment. This information allows the linen processing facility to track abuse and misuse of textile items by customer, to determine the frequency of each customer's improper use and storage. The customer who last used the items found stained is assumed to be responsible for causing the stain during the last use.

Since most commercial linen services are designed to provide repeat services to customers and most frequently with 100 or more items per delivery and sometimes more than 10,000 items in a single delivery and frequently tens of thousands of items in a month, the estimates for numbers of linens actually lost or abused with fractional tagging can generally be accurately projected in reasonably short periods without customer site scanning. A medium sized customer might require three to five months to achieve similar reliability as that produced by a large customer in a single month. A smaller customer may require six to twelve months or more.

FIG. 6-FIG. 11 provide a number of specific examples of inventory management using the various preferred embodiments of the present invention. Inventory mechanism 264 of FIG. 2 maintains the results of each customer premise scan including the number of items that were suspected as lost but that were eventually found in database 262. This type of data enables Related to the system of identifying probable lost items, the system also watches for changes in each customer's usage pattern, going from stable to unstable or vice versa, meaning going from more consistently FIFO (First In First Out) usage and return to more random or going from more random to more FIFO. The percentage of items returned in the soiled linen inventory that were out of chronological rotation can be used to determine the relative adherence to the FIFO standard. The inventory mechanism can report changes in linen usage and storage practices, which can reinforce changes made which will generally improve FIFO adherence or alert the user to changes that are degrading FIFO adherence.

The detection of specific situations indicating loss of control at a customer location will be reported to the appropriate management of the linen processing facility. For example, if the database sees no soiled linen return activity for a cart or its content of linens that were delivered prior to carts which show soiled linen return activity, this situation would be reported to the linen processing facility management for follow up with the customer.

Unless the textile manufacturer has inserted RFID tags into some of the new textile items, a fraction of brand new textile items manufactured for the linen service regularly require some new RFID tags to be inserted into a proportion of the new inventory after receipt by the linen service and before introduction to circulating inventory. As inventory wears out and must be withdrawn from inventory, a fraction of this inventory contains RFID tags. These items are retired and the RFID tags de-assigned and a reason given for the retirement, such as worn out, permanently stained, torn, etcetera. The linen service is able to have permanently stained or user torn/damaged items automatically billed to the last Customer for a quantity projected by the sum of the inverse of the fraction of each unit of inventory tagged and identified as requiring retirement due to abusive customer use.

The "unassigned" RFID tags that are removed from the retired inventory can be recycled by removing the tags from the retired inventory and installing the same, previously deployed RFID tags in new inventory and then assigning the recycled RFID tags back into circulation with their new identity added to the circulating inventory of RFID tagged items in the database. This is appropriate for RFID tags for which the anticipated life time cycles is sufficiently greater than the total cycles to date to ensure a high likelihood that the RFID tag will still be working by the end of the new textile item's projected total life cycles.

Assigning the RFID tag as a new textile item in the linen service database is the first step in tracking the new item's activity, starting with State 0, ready for service, to State 1 in the customer's custody, ready for use, in use, and returned for laundering, to State 2, regular laundering processes, through State 3, if necessary, special laundry processes, and returning to State 0, again ready for service, a pattern which repeats itself over and over again until the item is lost or damaged due to special cause or normal wear and tear to the extent that continued use is inappropriate.

RFID tags that fail to function prematurely usually fail due to a specific incident causing damage. Such an incident at a customer during usage would likely be accompanied by destruction of the textile items sufficient to render the textile item no longer serviceable. When the damaged item is returned to the linen processing facility for processing, that item due to the RFID tag's damage will not register its presence. To inventory mechanism 264 it will appear to be delayed in return to the linen service or missing at some point at the customer and classified as lost at some further point. The appropriateness of billing the item as lost, even though it was not lost, but instead damaged, is probably a distinction with little consequence. The result of an item that was prematurely "lost" for further service to the linen service company due to an action that took place while in the customer's custody prompting the purchase and replacement of the destroyed item is financially no different to either the customer or the linen service than an item that was still in usable condition, but, permanently lost.

The amount of textile items suffering sufficient damage while in customer use to destroy the RFID tag's ability to send ultra-high frequency signals sufficient without causing the textile item damage rendering it not fit for further use will be so small that it is of negligible consequence as the tags are specifically designed to withstands the rigors of the laundry process which is far more stressful than proper customer use. At the linen processing facility, the RFID tags are regularly subjected to submersion in water, high wash water temperatures usually around 135° F. or greater up to as much as 190° F., water extraction pressure subjecting the textiles and tags to more than the 750 pounds per square inch, dryer cycles producing RFID tag surface temperatures of over 200° F., flatwork ironing processing generating RFID tag surface temperatures in excess of 350° F. while under pressures in excess of 50 pounds per square inch.

Before the item is subjected to the rigors of laundering, however, it has been "scanned into" the linen processing facility in the soiled condition so that the item is normally known to have been returned from the last customer. If, during the linen processing cycle, the RFID tag fails, it will show up on the RFID tag system report as an item that was lost during the State 2 (Regular Renewal) or State 3 (Special Renewal) cycle. It will not be known by the system whether the item was physically lost due to an unknown cause or due to RFID tag failure (in which case the linen item is not actually lost and can continue its service life as effectively any untagged linen item).

Items that are identified as stained after a regular wash in State 2, Regular Renewal, are scanned as still stained after the initial regular wash and then transition to State 3, Special Renewal (special remedial processing). This enables the linen processing facility to quantify the costs of reprocessing textiles from certain hard use customers who may be abusing the linen processing facility's textiles and increasing its costs of doing business and thereby lowering its profitability.

Excessively hard linen use, abuse, and improper storage of textile items are mainly discretionary activities that can be avoided by the customer with proper staff selection, training, and systems. A linen service without RFID tag utilization may have difficulty identifying the source of abused linens. While sorting and in some cases counting soiled linen items utilizing manual counting or semi-automated counting systems typically employing both sorting labor and photo eye sensors as items go by on a conveyor or through a vacuum tube, the linen items are often not adequately presented during soiled linen categorization for operator inspection to identify abused items due in part to the crumpled state typical of soiled textile items Additionally, prior to washing, soils that cause permanent stains are often not readily distinguishable from soils of the type that are expected and are usually easily removed during regular washing. RFID tag scanning in State 3 of all items rejected during finishing due to stubborn stains still present after State 2 processing identifies the last customer who used the item and only identifies items as abused which actually are still stained by materials that did not wash out as expected in a regular wash.

Identifying stained items that are RFID tagged and were scanned out to the last user is much more effective, reliable and efficient during clean linen finishing than identifying abused and stained soiled items during soiled linen sorting or counting. Items are inspected more closely during clean linen finishing processes to assure satisfaction for the next user of the clean items than in soiled linen sorting. Clean linen finishing usually requires the items to be spread out at least at the beginning step of finishing and most or all clean items require careful inspection during finishing to assure that only fit for use items are returned to the customer, particularly given that the clean linen finishing process affords much better opportunity.

Typically, for items that are still stained after the second wash, the generic stain removal wash, are inspected and determined to be a) not likely to be returned to fit for use condition, in which case such items are retired, or b) candidates for more intensive washing formulas designed to remove specific types of stubborn stains, for instance oxidizable stains, such as mildew; hydrocarbon stains, such as lubricants; paints and inks; or reducible stains, such as rust. Before these items are set aside for washing they may be scanned and classified by the special type of stain so that the linen processing facility can monitor the next steps effectiveness in removing specific types of stubborn stains.

Textiles for which the more intensive and stain specific stain removal processes of State 3 do not yield fit for use items have to be retired. At that point the customer who used the item last should be billed for destroying the item.

Textiles that have tears or open hems due to stitches coming out have to be either repaired or if repair is impractical then retired. Torn items can be handled similarly to items still stained after regular washing particularly if they appear to otherwise have a substantial number of cycles left before actually wearing out. The items with RFID tags that have the same reason for retirement may be de-assigned in mass in a single de-assignment scan. Where present and functioning, the RFID tag is removed, and if it has not yet attained a number of readings where it is considered too likely that the tag will stop transmitting readable serial number data prior to the retirement of the textile item it would otherwise next be re-assigned to a new item. Textile items from newly issued to being worn out and withdrawn from use varies from as little as less than ten expected uses and launderings for cotton kitchen towels to as much as approximately 200 cycles for 100% polyester dark colored dining napkins.

Certain RFID tags manufactured for insertion in launderable textiles appear to reliably last up to 350 or more cycles. The RFID tag at de-assignment is flagged in database 262 as having been de-assigned and consequently will then no longer be associated with the previously assigned textile. Database 262 is updated with the reason for the retirement, such as stained, torn, obsolete, color inconsistency, worn out, etc. At de-assignment, the reason for retirement is entered into database 262. Inventory mechanism 264 can be set up to automatically bill the customer for an item destroyed while in State 1, in customer's care. This information when later summarized with other tag data will often be valuable to in evaluating individual manufacturer textile quality and durability, washing formula effectiveness, equipment effectiveness, and customer textile usage practices.

The usable removed and de-assigned RFID tags are added to the stock of previously used, unassigned tags and are thereafter inserted into new textile items just as brand new tags are. It is anticipated that in the future, RFID tag manufacturers will continue to reduce their costs of manufacture and increase the durability of the tags so that an increasing number of scans will be achieved before tag retirement.

Items that are either returned to fit for use condition or retired after special stain removal processing can be analyzed through the records contained in database 262 to determine which customers are so hard on the textiles that they often generate soiled linens that have to be washed two or three times before returning to service or even retired and the nature of the stubborn oxidizable, reducible, paint/ink, or hydrocarbon based staines. Similarly items that cannot be returned to active service are recorded and analysis can be made to quantify the severity of frequent textile abusers.

Customers in this scenario can be given sufficient information to determine the extent of the problem and the nature of the problem so that effective remedial action can be considered and taken. Providing a different type of item, or providing a textile item constructed of a different fiber could be among the many options to consider once this detail of information is analyzed and reviewed by the linen processing facility and/or its customer. Changes in washing formulas can be devised to respond to the linen service awareness of excessively high re-work or too low of expected servings for certain classes of items.

Also, specific manufacturers' textile goods may be monitored to determine if certain manufacturers are generating more or less problems with hems coming loose, holes developing in the fabric, or color loss sufficient to make an item no longer fit for customer use.

Textile products other than apparel provided by linen service laundries are rarely personalized to individual persons or even specific linen users as there is typically little or no benefit gained and the cost is prohibitive. Therefore linens are typically pooled inventory while garments are most commonly wearer specific and assigned to a specific wearer within the customer's organization.

In the case of uniforms assigned to specific persons within a customer, 100% inventory tagging, rather than fractional tagging, is generally preferred, if not necessary. One hundred percent tagging with person personalized garment service allows accountability to the actual person wearing his or her assigned garments, a number typically in the range of only 7 to 13 pieces, too small for accurate and timely fractional tagging and 100% tagging facilitates automated sorting of the garments post finishing at the linen processing facility into individual person batches ready for delivery.

It is important to note that while the present invention has been described in the context of a fully functional computer system with certain application software, those skilled in the art will appreciate that the various software mechanisms of the present invention are capable of being distributed as a program product in conjunction with an article of manufacture comprising software stored on a computer readable storage medium in a variety of forms, and that the various preferred embodiments of the present invention applies equally regardless of the particular type or storage medium used to actually carry out the distribution. Examples of computer readable storage media include: recordable type media such as DVD and CD ROMS disks and transmission type media such as digital and analog communication links, including wireless communication links.

From the foregoing description, it should be appreciated that a unique system and method for tracking and managing inventory, particularly for the linen service industry, is provided by the various preferred embodiments of the present invention and that the various preferred embodiments offer significant benefits that would be apparent to one skilled in the art. For example, those skilled in the art will understand that additional preferred embodiments of the inventory tracking system, as well as the billing and inventory management methods described herein could be readily adapted for use in other inventory applications as well. For example, additional inventory items such as silverware, rented sports equipment, etc. could be tracked using one or more of the preferred embodiments of the present invention described in this disclosure.

Furthermore, while multiple preferred embodiments have been presented in the foregoing description, it should be appreciated that a vast number of variations in the preferred embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. A method of inventory management, the method comprising the steps of:
   tagging at least some of a plurality of inventory items with an RFID tag to create a plurality of RFID tagged inventory items;
   combining the RFID tagged inventory items with a plurality of non-RFID tagged inventory items to create a mixed inventory wherein a pre-identified optimal percentage of the mixed inventory comprises RFID tagged inventory items, wherein the pre-identified optimal percentage is determined by at least one of a plurality of scoring variables, the plurality of scoring variables comprising: 1) the approximate number of the items served on the average per week to each customer that uses the item; 2) frequency of delivery; 3) the cost of tag installation; 4) the likelihood of the items becoming lost, abused, delayed in being used and returned for repair or replacement; 5) the cost of adding a new item to the inventory; 6) the anticipated number of uses over item life time before retirement due to normal wear and tear; 7) the anticipated number of tag cycles before failure of the tag itself due to normal wear and tear; 8) the likelihood that loss and abuse will be stopped if the customer/linen user organization is aware of the extent of the loss and abuse; 9) the number and importance of opportunities in laundry production to track production processing of items by operator for tagged items to facilitate determining quality of workmanship by operator and quantity of output by production operator; and 10) the variance of the number of servings achievable before retirement by various textile manufacturers of each item;
   transporting the mixed inventory to a customer location, using at least one delivery vehicle;
   leaving the mixed inventory at the customer location for a period of time; retrieving the mixed inventory from the customer location;
   transporting the mixed inventory to a laundry service facility;
   using at least one RFID scanner at the laundry service facility to scan the mixed inventory and determine a number representing the number of RFID tagged inventory items contained in the mixed inventory; and
   performing at least one task based on the number of RFID tagged inventory items contained in the mixed inventory.

2. The method of claim 1 wherein the at least one task comprises at least one of: adjusting a delivery schedule for at least one future delivery to the customer location;
   adjusting at least one invoice for the customer location; adding or deleting at least one item contained in the mixed inventory; and adjusting the optimal percentage of the mixed inventory.

3. The method of claim 1 further comprising the steps of:
   using at least one RFID scanner at the customer location to scan the mixed inventory and determine a number representing the number of RFID tagged inventory items contained in the mixed inventory;
   comparing the number of RFID tagged inventory items determined by the RFID scanner at the customer facility to the pre-identified optimal percentage of RFID tagged inventory items.

4. The method of claim 1 where the pre-identified optimal percentage of RFID tagged inventory items in the mixed inventory is in the range of -20%.

5. The method of claim 1 where the pre-identified optimal percentage of RFID tagged inventory items in the mixed inventory is in the range of 3%-10%.

6. The method of claim 1 further comprising the steps of:
identifying inventory abuse based on a series of RFID scans of the mixed inventory as determined by an actual percentage of RFID tagged items in the mixed inventory as compared to an expected value for the percentage of RFID tagged items in the mixed inventory.

7. The method of claim 1 further comprising the steps of;
calculating a total score for the mixed inventory by using a plurality of scoring categories; and
adjusting the percentage of the mixed inventory be tagged with an RFID tag by selecting a corresponding percentage from a table based on the total score.

8. The method of claim 1 further comprising the step of manually assigning each inventory item in the mixed inventory to one of four categories, the four categories comprising: initialization; utilization; regular renewal; and special renewal.

9. A system comprising:
a plurality of inventory items, wherein a predetermined subset of the plurality of inventory items are tagged with an RFID tag, wherein each of the plurality of inventory items is assigned to one of four categories, the four categories comprising: initialization; utilization; regular renewal; and special renewal and wherein the assigned category is based upon a visual inspection of each of the plurality of inventory items;
a plurality of scoring categories comprising: an approximate number of the plurality of inventory items served in an average week to each of a plurality of customers that uses each of the plurality of inventory items; the frequency of delivery for each of the inventory items; the cost of installing an RFID tag in each of the plurality of inventory items; the likelihood of each of the inventory items becoming lost, abused, delayed in being used and returned for service; the cost of adding a new inventory item to the plurality of inventory items; an anticipated number of life time uses before retirement of each of the plurality of inventory item due to normal wear and tear; an anticipated number of cycles before retirement due to normal wear and tear on an RFID installed in each of the plurality of inventory items; the likelihood that loss and abuse of the plurality of inventory items will be reduced if the plurality of customers are aware of the extent of loss and abuse of the plurality of inventory items; a number and importance of opportunities in laundry production to track production processing of items by operator for tagged items to facilitate determining quality of workmanship by operator and quantity of output by production operator; and a variance measurement measuring a number of servings achievable for the plurality of inventory items before retirement by at least one manufacturer of each of the plurality of inventory items;
a CPU;
a memory coupled to the CPU; at least one RFID scanner;
an inventory mechanism residing in the memory, the inventory mechanism being communicatively coupled to the RFID scanner, the RFID scanner gathering information about the plurality of inventory items, the RFID scanner transmitting the information about the plurality of inventory items to the inventory mechanism, the information about the plurality of inventory items being used to manage the inventory items;
a percentage value used to determine the subset of the plurality of inventory items to be tagged with an RFID tag based on the plurality of scoring categories, the percentage value ranging from 1% to 20%;
four categories defining each of the plurality of inventory items, the four categories comprising: initialization; utilization; regular renewal; and special renewal.

10. The system of claim 9 further comprising a plurality of reports generated by the inventory mechanism based on an actual number of RFID tags detected by the at least one RFID scanner compared to an expected number of RFID tags.

* * * * *